United States Patent
Lee et al.

(10) Patent No.: US 12,433,708 B2
(45) Date of Patent: Oct. 7, 2025

(54) BARRIER DRAPE ADAPTERS FOR ROBOTIC SURGICAL SYSTEMS

(71) Applicant: EndoQuest Robotics, Inc., Houston, TX (US)

(72) Inventors: Jaesun Lee, Seongnam (KR); Jeihan Lee, Houston, TX (US); Dongsuk Shin, Houston, TX (US)

(73) Assignee: EndoQuest Robotics, Inc., Houston, TX (US)

( * ) Notice: Subject to any disclaimer, the term of this patent is extended or adjusted under 35 U.S.C. 154(b) by 0 days.

(21) Appl. No.: 18/198,761

(22) Filed: May 17, 2023

(65) Prior Publication Data

US 2023/0363847 A1    Nov. 16, 2023

Related U.S. Application Data

(63) Continuation of application No. PCT/US2022/051262, filed on Nov. 29, 2022.

(Continued)

(51) Int. Cl.
*A61B 46/10*    (2016.01)
*A61B 46/23*    (2016.01)

(52) U.S. Cl.
CPC .............. *A61B 46/10* (2016.02); *A61B 46/23* (2016.02)

(58) Field of Classification Search
CPC ................................ A61B 46/10; A61B 46/23

(Continued)

(56) References Cited

U.S. PATENT DOCUMENTS

| 5,792,135 A | 8/1998 | Madhani et al. |
| 5,797,900 A | 8/1998 | Madhani et al. |

(Continued)

FOREIGN PATENT DOCUMENTS

| CN | 104958111 A | 10/2015 |
| CN | 105310775 A | 2/2016 |

(Continued)

OTHER PUBLICATIONS

"Plenary 1: Colubris MX"—YouTube Video link address https://www.youtube.com/watch?v=in_luQiAZg8 dated Aug. 20, 2020.

(Continued)

*Primary Examiner* — Aaron F Roane
(74) *Attorney, Agent, or Firm* — Troutman Pepper Locke LLP; Scott D. Wofsy; Michael J. Pollack

(57) ABSTRACT

A controller adapter system for a robotic surgical instrument controller assembly can include an instrument controller having a housing and one or more controller actuators. The housing can be configured to receive a drape opening structure on the housing. The system can include an inner drape adapter configured to mount to the instrument controller and extend distally from the instrument controller. The inner drape adapter can include one or more adapter actuators configured to receive actuation from the one or more controller actuators at a proximal side thereof, and to transmit the actuation to a distal side thereof. The system can include an outer drape adapter configured to axially retain the inner drape adapter to the instrument controller. The outer drape adapter can be configured to sandwich the drape opening structure to the housing of the instrument controller.

21 Claims, 23 Drawing Sheets

Related U.S. Application Data

(60) Provisional application No. 63/284,289, filed on Nov. 30, 2021.

(58) Field of Classification Search
USPC .................................................................. 606/1
See application file for complete search history.

(56) References Cited

U.S. PATENT DOCUMENTS

| | | | |
|---|---|---|---|
| 5,976,122 | A | 11/1999 | Madhani et al. |
| 6,063,095 | A | 5/2000 | Wang et al. |
| 6,132,368 | A | 10/2000 | Cooper |
| 6,244,809 | B1 | 6/2001 | Wang et al. |
| 6,246,200 | B1 | 6/2001 | Blumenkranz et al. |
| 6,312,435 | B1 | 11/2001 | Wallace et al. |
| 6,331,181 | B1 | 12/2001 | Tierney et al. |
| 6,346,072 | B1 | 2/2002 | Cooper |
| 6,364,888 | B1 | 4/2002 | Niemeyer et al. |
| 6,371,952 | B1 | 4/2002 | Madhani et al. |
| 6,394,998 | B1 | 5/2002 | Wallace et al. |
| 6,424,885 | B1 | 7/2002 | Niemeyer et al. |
| 6,441,577 | B2 | 8/2002 | Blumenkranz et al. |
| 6,451,027 | B1 | 9/2002 | Cooper et al. |
| 6,491,691 | B1 | 12/2002 | Morley et al. |
| 6,491,701 | B2 | 12/2002 | Tierney et al. |
| 6,493,608 | B1 | 12/2002 | Niemeyer |
| 6,522,906 | B1 | 2/2003 | Salisbury, Jr. et al. |
| 6,565,554 | B1 | 5/2003 | Niemeyer |
| 6,587,750 | B2 | 7/2003 | Gerbi et al. |
| 6,645,196 | B1 | 11/2003 | Nixon et al. |
| 6,671,581 | B2 | 12/2003 | Niemeyer et al. |
| 6,676,684 | B1 | 1/2004 | Morley et al. |
| 6,684,129 | B2 | 1/2004 | Salisbury, Jr. et al. |
| 6,699,177 | B1 | 3/2004 | Wang et al. |
| 6,699,235 | B2 | 3/2004 | Wallace et al. |
| 6,714,839 | B2 | 3/2004 | Salisbury, Jr. et al. |
| 6,746,443 | B1 | 6/2004 | Morley et al. |
| 6,766,204 | B2 | 7/2004 | Niemeyer et al. |
| 6,783,524 | B2 | 8/2004 | Anderson et al. |
| 6,785,593 | B2 | 8/2004 | Wang et al. |
| 6,799,088 | B2 | 9/2004 | Wang et al. |
| 6,817,972 | B2 | 11/2004 | Snow |
| 6,817,974 | B2 | 11/2004 | Cooper et al. |
| 6,836,703 | B2 | 12/2004 | Wang et al. |
| 6,837,846 | B2 | 1/2005 | Jaffe et al. |
| 6,840,938 | B1 | 1/2005 | Morley et al. |
| 6,852,107 | B2 | 2/2005 | Wang et al. |
| 6,866,671 | B2 | 3/2005 | Tierney et al. |
| 6,871,117 | B2 | 3/2005 | Wang et al. |
| 6,892,112 | B2 | 5/2005 | Wang et al. |
| 6,905,491 | B1 | 6/2005 | Wang et al. |
| 6,951,535 | B2 | 10/2005 | Ghodoussi et al. |
| 6,991,627 | B2 | 1/2006 | Madhani et al. |
| 6,994,703 | B2 | 2/2006 | Wang et al. |
| 7,025,064 | B2 | 4/2006 | Wang et al. |
| 7,027,892 | B2 | 4/2006 | Wang et al. |
| 7,048,745 | B2 | 5/2006 | Tierney et al. |
| 7,066,926 | B2 | 6/2006 | Wallace et al. |
| 7,074,179 | B2 | 7/2006 | Wang et al. |
| 7,083,571 | B2 | 8/2006 | Wang et al. |
| 7,087,049 | B2 | 8/2006 | Nowlin et al. |
| 7,090,637 | B2 | 8/2006 | Danitz et al. |
| 7,118,582 | B1 | 10/2006 | Wang et al. |
| 7,125,403 | B2 | 10/2006 | Julian et al. |
| 7,155,315 | B2 | 12/2006 | Niemeyer et al. |
| 7,204,844 | B2 | 4/2007 | Jensen et al. |
| 7,276,065 | B2 | 10/2007 | Morley et al. |
| 7,320,700 | B2 | 1/2008 | Cooper et al. |
| 7,331,967 | B2 | 2/2008 | Lee et al. |
| 7,333,642 | B2 | 2/2008 | Green |
| 7,357,774 | B2 | 4/2008 | Cooper |
| 7,398,707 | B2 | 7/2008 | Morley et al. |
| 7,524,320 | B2 | 4/2009 | Tierney et al. |
| 7,574,250 | B2 | 8/2009 | Niemeyer |
| 7,608,083 | B2 | 10/2009 | Lee et al. |
| 7,615,066 | B2 | 11/2009 | Danitz et al. |
| 7,691,098 | B2 | 4/2010 | Wallace et al. |
| 7,744,608 | B2 | 6/2010 | Lee et al. |
| 7,756,036 | B2 | 7/2010 | Druke et al. |
| 7,757,028 | B2 | 7/2010 | Druke et al. |
| 7,763,015 | B2 | 7/2010 | Cooper et al. |
| 7,780,651 | B2 | 8/2010 | Madhani et al. |
| 7,837,674 | B2 | 11/2010 | Cooper |
| 7,854,738 | B2 | 12/2010 | Lee et al. |
| 7,865,266 | B2 | 1/2011 | Moll et al. |
| 7,955,322 | B2 | 6/2011 | Devengenzo et al. |
| 8,052,636 | B2 | 11/2011 | Moll et al. |
| 8,054,752 | B2 | 11/2011 | Druke et al. |
| 8,068,649 | B2 | 11/2011 | Green |
| 8,075,474 | B2 | 12/2011 | Honda et al. |
| 8,100,133 | B2 | 1/2012 | Mintz et al. |
| 8,120,301 | B2 | 2/2012 | Goldberg et al. |
| 8,123,740 | B2 | 2/2012 | Madhani et al. |
| 8,147,503 | B2 | 4/2012 | Zhao et al. |
| 8,169,468 | B2 | 5/2012 | Scott et al. |
| 8,182,415 | B2 | 5/2012 | Larkin et al. |
| 8,190,238 | B2 | 5/2012 | Moll et al. |
| 8,228,368 | B2 | 7/2012 | Zhao et al. |
| 8,323,297 | B2 | 12/2012 | Hinman et al. |
| 8,335,590 | B2 | 12/2012 | Costa et al. |
| 8,337,521 | B2 | 12/2012 | Cooper et al. |
| 8,343,045 | B2 | 1/2013 | Swinehart et al. |
| 8,343,141 | B2 | 1/2013 | Madhani et al. |
| 8,365,633 | B2 | 2/2013 | Simaan et al. |
| 8,375,808 | B2 | 2/2013 | Blumenkranz et al. |
| 8,398,541 | B2 | 3/2013 | DiMaio et al. |
| 8,437,629 | B2 | 5/2013 | McDowall |
| 8,469,947 | B2 | 6/2013 | Devengenzo et al. |
| 8,475,366 | B2 | 7/2013 | Boulais et al. |
| 8,506,555 | B2 | 8/2013 | Ruiz Morales |
| 8,594,841 | B2 | 11/2013 | Zhao et al. |
| 8,597,280 | B2 | 12/2013 | Cooper et al. |
| 8,600,551 | B2 | 12/2013 | Tkowitz et al. |
| 8,617,102 | B2 | 12/2013 | Moll et al. |
| 8,644,988 | B2 | 2/2014 | Prisco et al. |
| 8,679,099 | B2 | 3/2014 | Cooper et al. |
| 8,690,908 | B2 | 4/2014 | Cooper et al. |
| 8,709,000 | B2 | 4/2014 | Madhani et al. |
| 8,740,885 | B2 | 6/2014 | Larkin et al. |
| 8,784,435 | B2 | 7/2014 | Cooper et al. |
| 8,786,241 | B2 | 7/2014 | Nowlin et al. |
| 8,790,243 | B2 | 7/2014 | Cooper et al. |
| 8,801,661 | B2 | 8/2014 | Moll et al. |
| 8,810,631 | B2 | 8/2014 | Scott et al. |
| 8,816,628 | B2 | 8/2014 | Nowlin et al. |
| 8,821,480 | B2 | 9/2014 | Burbank |
| 8,831,782 | B2 | 9/2014 | Itkowitz |
| 8,838,270 | B2 | 9/2014 | Druke et al. |
| 8,852,208 | B2 | 10/2014 | Gomez et al. |
| 8,887,595 | B2 | 11/2014 | Williams |
| 8,888,690 | B2 | 11/2014 | Swinehart et al. |
| 8,888,764 | B2 | 11/2014 | Devengenzo et al. |
| 8,903,549 | B2 | 12/2014 | Itkowitz et al. |
| 8,918,207 | B2 | 12/2014 | Prisco |
| 8,944,070 | B2 | 2/2015 | Guthart et al. |
| 8,945,095 | B2 | 2/2015 | Blumenkranz et al. |
| 9,011,318 | B2 | 4/2015 | Choset et al. |
| 9,050,120 | B2 | 6/2015 | Swarup et al. |
| 9,060,678 | B2 | 6/2015 | Larkin et al. |
| 9,089,354 | B2 | 7/2015 | Simaan et al. |
| 9,095,362 | B2 | 8/2015 | Dachs et al. |
| 9,138,284 | B2 | 9/2015 | Krom et al. |
| 9,144,456 | B2 | 9/2015 | Rosa et al. |
| 9,186,221 | B2 | 11/2015 | Burbank |
| 9,254,090 | B2 | 2/2016 | Watson et al. |
| 9,259,274 | B2 | 2/2016 | Prisco |
| 9,259,276 | B2 | 2/2016 | Mintz et al. |
| 9,301,807 | B2 | 4/2016 | Duval |
| 9,308,937 | B2 | 4/2016 | Griffiths et al. |
| 9,339,341 | B2 | 5/2016 | Cooper |
| 9,358,074 | B2 | 6/2016 | Schena et al. |
| 9,456,839 | B2 | 10/2016 | Cooper |
| 9,486,288 | B2 | 11/2016 | Devengenzo et al. |
| 9,498,242 | B2 | 11/2016 | Crews et al. |

(56) References Cited

U.S. PATENT DOCUMENTS

| | | |
|---|---|---|
| 9,504,517 B2 | 11/2016 | Rosa et al. |
| 9,510,915 B2 | 12/2016 | Madhani et al. |
| 9,565,990 B2 | 2/2017 | Lee et al. |
| 9,687,310 B2 | 6/2017 | Nowlin et al. |
| 9,717,486 B2 | 8/2017 | Cooper et al. |
| 9,757,149 B2 | 9/2017 | Cooper et al. |
| 9,757,203 B2 | 9/2017 | Hourtash et al. |
| 9,775,678 B2 | 10/2017 | Lohmeier |
| 9,782,056 B2 | 10/2017 | McDowall |
| 9,782,225 B2 | 10/2017 | Lohmeier et al. |
| 9,795,446 B2 | 10/2017 | DiMaio et al. |
| 9,795,453 B2 | 10/2017 | Tierney et al. |
| 9,801,526 B2 | 10/2017 | Larkin et al. |
| 9,801,654 B2 | 10/2017 | Gomez et al. |
| 9,814,527 B2 | 11/2017 | Rogers et al. |
| 9,877,794 B2 | 1/2018 | Csiky |
| 9,901,402 B2 | 2/2018 | Itkowitz et al. |
| 9,918,659 B2 | 3/2018 | Chopra et al. |
| 9,949,620 B2 | 4/2018 | Duval et al. |
| 9,962,066 B2 | 5/2018 | Rogers et al. |
| 9,968,405 B2 | 5/2018 | Cooper et al. |
| 9,980,630 B2 | 5/2018 | Larkin et al. |
| 10,010,331 B2 | 7/2018 | Morash |
| 10,039,473 B2 | 8/2018 | Zhao et al. |
| 10,058,390 B2 | 8/2018 | Simaan et al. |
| 10,085,788 B2 | 10/2018 | Privitera et al. |
| 10,085,806 B2 | 10/2018 | Hagn et al. |
| 10,092,172 B2 | 10/2018 | Peh et al. |
| 10,105,128 B2 | 10/2018 | Cooper et al. |
| 10,117,715 B2 | 11/2018 | Lohmeier et al. |
| 10,159,536 B2 | 12/2018 | Kralicky et al. |
| 10,178,368 B2 | 1/2019 | Zhao et al. |
| 10,179,024 B2 | 1/2019 | Yeung |
| 10,179,413 B2 | 1/2019 | Rockrohr |
| 10,188,472 B2 | 1/2019 | Diolaiti et al. |
| 10,258,421 B2 | 4/2019 | Lohmeier et al. |
| 10,278,782 B2 | 5/2019 | Jarc et al. |
| 10,321,964 B2 | 6/2019 | Grover et al. |
| 10,327,856 B2 | 6/2019 | Kralicky et al. |
| 10,363,107 B2 | 7/2019 | Blumenkranz et al. |
| 10,365,295 B2 | 7/2019 | Blumenkranz et al. |
| 10,390,687 B2 | 8/2019 | Choi et al. |
| 10,390,895 B2 | 8/2019 | Henderson et al. |
| 10,391,635 B2 | 8/2019 | Berghofer et al. |
| 10,398,520 B2 | 9/2019 | Arkin et al. |
| 10,413,370 B2 | 9/2019 | Yates et al. |
| 10,448,813 B2 | 10/2019 | Cooper et al. |
| 10,456,166 B2 | 10/2019 | Cooper et al. |
| 10,507,068 B2 | 12/2019 | Kopp et al. |
| 10,512,481 B2 | 12/2019 | Cooper |
| 10,524,644 B2 | 1/2020 | Scott et al. |
| 10,524,868 B2 | 1/2020 | Cooper et al. |
| 10,531,929 B2 | 1/2020 | Widenhouse et al. |
| 10,602,958 B2 | 3/2020 | Silverstein et al. |
| 10,646,990 B2 | 5/2020 | Olds et al. |
| 10,660,713 B2 | 5/2020 | McCrea et al. |
| 10,682,193 B2 | 6/2020 | Choi et al. |
| 10,729,503 B2 | 8/2020 | Cameron |
| 10,736,702 B2 | 8/2020 | Harris et al. |
| 10,779,896 B2 | 9/2020 | Dachs, II et al. |
| 10,779,899 B2 | 9/2020 | Griffiths et al. |
| 10,786,329 B2 | 9/2020 | Schuh et al. |
| 10,820,953 B2 | 11/2020 | Kralicky et al. |
| 10,828,115 B2 | 11/2020 | Koenig et al. |
| 10,828,117 B2 | 11/2020 | Evans |
| 10,835,331 B2 | 11/2020 | Burbank |
| 10,835,335 B2 | 11/2020 | Perdue et al. |
| 10,856,946 B2 | 12/2020 | Solomon et al. |
| 10,864,051 B2 | 12/2020 | Simi et al. |
| 10,874,475 B2 | 12/2020 | Iceman |
| 10,898,189 B2 | 1/2021 | McDonald, II |
| 10,898,281 B2 | 1/2021 | Cooper et al. |
| 10,905,505 B1 | 2/2021 | Barakat et al. |
| 10,918,449 B2 | 2/2021 | Solomon et al. |
| 10,939,970 B2 | 3/2021 | Laakso et al. |
| 10,959,607 B2 | 3/2021 | Rogers et al. |
| 2002/0161281 A1 | 10/2002 | Jaffe et al. |
| 2003/0036748 A1 | 2/2003 | Cooper et al. |
| 2003/0083673 A1 | 5/2003 | Tierney et al. |
| 2003/0114962 A1 | 6/2003 | Niemeyer |
| 2003/0135203 A1 | 7/2003 | Wang et al. |
| 2004/0049205 A1 | 3/2004 | Lee et al. |
| 2004/0138700 A1 | 7/2004 | Cooper et al. |
| 2004/0162547 A1 | 8/2004 | Wallace et al. |
| 2004/0236316 A1 | 11/2004 | Danitz et al. |
| 2005/0043718 A1 | 2/2005 | Madhani et al. |
| 2005/0059960 A1 | 3/2005 | Simaan et al. |
| 2005/0149003 A1 | 7/2005 | Tierney et al. |
| 2005/0200324 A1 | 9/2005 | Guthart et al. |
| 2005/0204851 A1 | 9/2005 | Morley et al. |
| 2005/0216033 A1 | 9/2005 | Lee et al. |
| 2005/0251112 A1 | 11/2005 | Danitz et al. |
| 2006/0167440 A1 | 7/2006 | Cooper et al. |
| 2007/0043338 A1 | 2/2007 | Moll et al. |
| 2007/0137372 A1 | 6/2007 | Devengenzo et al. |
| 2007/0151390 A1 | 7/2007 | Blumenkranz et al. |
| 2007/0156119 A1 | 7/2007 | Wallace et al. |
| 2007/0156122 A1 | 7/2007 | Cooper |
| 2007/0197896 A1 | 8/2007 | Moll et al. |
| 2008/0065105 A1 | 3/2008 | Larkin et al. |
| 2008/0065107 A1 | 3/2008 | Larkin et al. |
| 2008/0065111 A1 | 3/2008 | Blumenkranz et al. |
| 2008/0071291 A1 | 3/2008 | Duval et al. |
| 2008/0077159 A1 | 3/2008 | Madhani et al. |
| 2008/0177282 A1 | 7/2008 | Lee et al. |
| 2008/0177284 A1 | 7/2008 | Lee et al. |
| 2008/0287963 A1 | 11/2008 | Rogers et al. |
| 2009/0023989 A1 | 1/2009 | Honda et al. |
| 2009/0171151 A1 | 7/2009 | Choset et al. |
| 2010/0011901 A1 | 1/2010 | Burbank |
| 2010/0048999 A1 | 2/2010 | Boulais et al. |
| 2010/0082041 A1 | 4/2010 | Prisco |
| 2010/0234831 A1 | 9/2010 | Hinman et al. |
| 2010/0274087 A1 | 10/2010 | Diolaiti et al. |
| 2010/0292708 A1 | 11/2010 | Madhani et al. |
| 2011/0118755 A1 | 5/2011 | Cooper et al. |
| 2011/0125166 A1 | 5/2011 | Cooper et al. |
| 2011/0144658 A1 | 6/2011 | Wenderow et al. |
| 2011/0152879 A1 | 6/2011 | Williams |
| 2011/0196419 A1 | 8/2011 | Cooper |
| 2011/0277580 A1 | 11/2011 | Cooper et al. |
| 2011/0282351 A1 | 11/2011 | Cooper et al. |
| 2011/0282359 A1* | 11/2011 | Duval .................. A61B 34/35 606/130 |
| 2011/0282491 A1 | 11/2011 | Prisco et al. |
| 2011/0288561 A1 | 11/2011 | Devengenzo et al. |
| 2011/0313449 A1 | 12/2011 | Cooper |
| 2012/0150192 A1 | 6/2012 | Dachs et al. |
| 2012/0203271 A1 | 8/2012 | Larkin et al. |
| 2012/0209174 A1 | 8/2012 | Moll et al. |
| 2012/0221011 A1 | 8/2012 | Larkin et al. |
| 2012/0232339 A1 | 9/2012 | Csiky |
| 2013/0053868 A1 | 2/2013 | Cooper et al. |
| 2013/0079794 A9 | 3/2013 | Cooper et al. |
| 2013/0096540 A1 | 4/2013 | Cooper et al. |
| 2013/0110131 A1 | 5/2013 | Madhani et al. |
| 2013/0197539 A1 | 8/2013 | Simaan et al. |
| 2013/0197540 A1 | 8/2013 | Simaan et al. |
| 2013/0267950 A1 | 10/2013 | Rosa et al. |
| 2013/0267964 A1 | 10/2013 | Rogers et al. |
| 2013/0274761 A1 | 10/2013 | Devengenzo et al. |
| 2014/0081292 A1 | 3/2014 | Moll et al. |
| 2014/0194899 A1 | 7/2014 | Madhani et al. |
| 2014/0243852 A1 | 8/2014 | Cooper et al. |
| 2014/0257336 A1 | 9/2014 | Choi et al. |
| 2014/0277106 A1 | 9/2014 | Crews et al. |
| 2014/0296637 A1 | 10/2014 | Lee et al. |
| 2014/0296872 A1 | 10/2014 | Cooper et al. |
| 2015/0066002 A1 | 3/2015 | Cooper et al. |
| 2015/0100066 A1 | 4/2015 | Kostrzewski et al. |
| 2015/0150636 A1 | 6/2015 | Hagn et al. |
| 2015/0173726 A1 | 6/2015 | Lohmeier et al. |
| 2015/0173729 A1 | 6/2015 | Lohmeier et al. |
| 2015/0173731 A1 | 6/2015 | Lohmeier et al. |

(56) References Cited

U.S. PATENT DOCUMENTS

| | | |
|---|---|---|
| 2015/0173840 A1 | 6/2015 | Lohmeier |
| 2015/0238267 A1 | 8/2015 | Devengenzo et al. |
| 2015/0250546 A1 | 9/2015 | Larkin et al. |
| 2016/0015447 A1 | 1/2016 | Rosa et al. |
| 2016/0058512 A1 | 3/2016 | Gomez et al. |
| 2016/0066773 A1 | 3/2016 | Cooper et al. |
| 2016/0242860 A1 | 8/2016 | Diolaiti et al. |
| 2016/0256183 A1 | 9/2016 | Cooper |
| 2017/0014197 A1 | 1/2017 | McCrea et al. |
| 2017/0020615 A1 | 1/2017 | Koenig et al. |
| 2017/0071628 A1 | 3/2017 | Cooper et al. |
| 2017/0112505 A1 | 4/2017 | Morash |
| 2017/0156804 A1 | 6/2017 | Cooper et al. |
| 2017/0265923 A1 | 9/2017 | Privitera et al. |
| 2017/0273749 A1 | 9/2017 | Grover et al. |
| 2017/0274533 A1 | 9/2017 | Berghofer et al. |
| 2017/0281296 A1 | 10/2017 | Cooper et al. |
| 2017/0312043 A1 | 11/2017 | Ogawa et al. |
| 2017/0325879 A1 | 11/2017 | Yeung |
| 2017/0354318 A1 | 12/2017 | Rogers et al. |
| 2017/0367775 A1 | 12/2017 | Dachs, II et al. |
| 2017/0367777 A1 | 12/2017 | Kralicky et al. |
| 2018/0000318 A9 | 1/2018 | Rogers et al. |
| 2018/0000548 A1 | 1/2018 | Olds et al. |
| 2018/0014852 A1 | 1/2018 | Gomez et al. |
| 2018/0049820 A1 | 2/2018 | Widenhouse et al. |
| 2018/0049822 A1 | 2/2018 | Henderson et al. |
| 2018/0049827 A1 | 2/2018 | Harris et al. |
| 2018/0064498 A1 | 3/2018 | Kapadia et al. |
| 2018/0111273 A1 | 4/2018 | Linnell et al. |
| 2018/0132956 A1 | 5/2018 | Cameron |
| 2018/0168747 A1 | 6/2018 | Kopp et al. |
| 2018/0168752 A1 | 6/2018 | Scheib et al. |
| 2018/0193007 A1 | 7/2018 | Au et al. |
| 2018/0200894 A1 | 7/2018 | Rockrohr |
| 2018/0214176 A1 | 8/2018 | Solomon et al. |
| 2018/0221096 A1 | 8/2018 | Yates et al. |
| 2018/0242824 A1 | 8/2018 | Larkin et al. |
| 2018/0256270 A1 | 9/2018 | Cooper et al. |
| 2018/0271607 A1 | 9/2018 | Kralicky et al. |
| 2018/0271616 A1 | 9/2018 | Schuh et al. |
| 2018/0286287 A1 | 10/2018 | Razzaque |
| 2018/0296299 A1 | 10/2018 | Iceman |
| 2018/0317915 A1 | 11/2018 | Mcdonald, II |
| 2018/0318023 A1 | 11/2018 | Griffiths et al. |
| 2018/0353204 A1 | 12/2018 | Solomon et al. |
| 2018/0370045 A1 | 12/2018 | Kan |
| 2019/0039241 A1 | 2/2019 | Langenfeld et al. |
| 2019/0099232 A1 | 4/2019 | Soto et al. |
| 2019/0125467 A1 | 5/2019 | Evans |
| 2019/0216551 A1 | 7/2019 | Burbank |
| 2019/0269472 A1 | 9/2019 | Kralicky et al. |
| 2019/0274769 A1 | 9/2019 | Perdue et al. |
| 2019/0314645 A1 | 10/2019 | Ciresianu et al. |
| 2019/0328472 A1 | 10/2019 | Tojo et al. |
| 2019/0380801 A1 | 12/2019 | Savall et al. |
| 2020/0038123 A1 | 2/2020 | Graetzel et al. |
| 2020/0069379 A1 | 3/2020 | Betsugi et al. |
| 2020/0069389 A1 | 3/2020 | Morrissette et al. |
| 2020/0146763 A1 | 5/2020 | Schena et al. |
| 2020/0170724 A1 | 6/2020 | Flatt et al. |
| 2020/0179067 A1 | 6/2020 | Ross et al. |
| 2020/0205917 A1 | 7/2020 | Peine et al. |
| 2020/0214774 A1 | 7/2020 | Yoshida et al. |
| 2020/0297444 A1 | 9/2020 | Camarillo et al. |
| 2020/0330173 A1 | 10/2020 | Kapadia et al. |
| 2020/0367979 A1 | 11/2020 | Laakso et al. |
| 2020/0397456 A1 | 12/2020 | Kim et al. |
| 2021/0045819 A1 | 2/2021 | Castillo et al. |
| 2021/0093398 A1 | 4/2021 | Ago et al. |
| 2021/0241542 A1 | 8/2021 | Shmayahu et al. |
| 2021/0259794 A1 | 8/2021 | Kato et al. |
| 2021/0267702 A1 | 9/2021 | Kim et al. |
| 2021/0275266 A1 | 9/2021 | Kim et al. |
| 2021/0322046 A1 | 10/2021 | Kim et al. |
| 2021/0338052 A1 | 11/2021 | Ouyang et al. |
| 2021/0346110 A1 | 11/2021 | Soto et al. |
| 2022/0354524 A1 | 11/2022 | Kim et al. |
| 2023/0070830 A1 | 3/2023 | Simi et al. |
| 2023/0210618 A1 | 7/2023 | Kim et al. |
| 2023/0210621 A1 | 7/2023 | Noh et al. |
| 2023/0248419 A1 | 8/2023 | Cho et al. |
| 2023/0248457 A1 | 8/2023 | Lee et al. |
| 2023/0255702 A1 | 8/2023 | Park et al. |
| 2023/0285090 A1 | 9/2023 | Lee et al. |
| 2023/0285098 A1 | 9/2023 | Lee et al. |
| 2023/0285099 A1 | 9/2023 | Lee et al. |
| 2023/0355221 A1 | 11/2023 | Shin et al. |
| 2023/0363842 A1 | 11/2023 | Choi et al. |
| 2023/0363847 A1 | 11/2023 | Lee et al. |
| 2024/0058079 A1 | 2/2024 | Kim et al. |

FOREIGN PATENT DOCUMENTS

| | | |
|---|---|---|
| CN | 108309370 A | 7/2018 |
| CN | 109674647 A | 4/2019 |
| CN | 213606867 U | 7/2021 |
| EP | 2968048 B1 | 6/2018 |
| EP | 3175813 B1 | 1/2020 |
| JP | 2019530517 A | 10/2019 |
| JP | 2020104843 A | 7/2020 |
| JP | 2021513442 A | 5/2021 |
| KR | 20110032444 A | 3/2011 |
| KR | 101943440 B1 | 1/2019 |
| TW | 201922179 A | 6/2019 |
| WO | 2012/035492 A1 | 3/2012 |
| WO | 2016/109886 A1 | 7/2016 |
| WO | 2019055681 A1 | 3/2019 |
| WO | 2020243285 A1 | 12/2020 |
| WO | 2021026231 A1 | 2/2021 |
| WO | 2021071540 A1 | 4/2021 |
| WO | 2021161162 A1 | 8/2021 |
| WO | 2021161184 A1 | 8/2021 |

OTHER PUBLICATIONS

International Search Report and Written Opinion, of the Korean Intellectual Property Office, as ISA, mailed Apr. 6, 2023, in corresponding International Patent Application PCT/US2022/051217.
International Search Report and Written Opinion, of the Korean Intellectual Property Office, as ISA, mailed Apr. 6, 2023, in corresponding International Patent Application PCT/US2022/051220.
International Search Report and Written Opinion, of the Korean Intellectual Property Office, as ISA, mailed Apr. 7, 2023, in corresponding International Patent Application PCT/US2022/051225.
International Search Report and Written Opinion, of the Korean Intellectual Property Office, as ISA, mailed Apr. 6, 2023, in corresponding International Patent Application PCT/US2022/051237.
International Search Report and Written Opinion, of the Korean Intellectual Property Office, as ISA, mailed Apr. 6, 2023, in corresponding International Patent Application PCT/US2022/051246.
International Search Report and Written Opinion, of the Korean Intellectual Property Office, as ISA, mailed Apr. 6, 2023, in corresponding International Patent Application PCT/US2022/051255.
International Search Report and Written Opinion, of the Korean Intellectual Property Office, as ISA, mailed Apr. 6, 2023, in corresponding International Patent Application PCT/US2022/051259.
International Search Report and Written Opinion, of the Korean Intellectual Property Office, as ISA, mailed Apr. 6, 2023, in corresponding International Patent Application PCT/US2022/051261.
International Search Report and Written Opinion, of the Korean Intellectual Property Office, as ISA, mailed Apr. 14, 2023, in corresponding International Patent Application PCT/US2022/051265.
International Search Report and Written Opinion, of the Korean Intellectual Property Office, as ISA, mailed Apr. 6, 2023, in corresponding International Patent Application PCT/US2022/051262.
Office Action mailed Jun. 7, 2023, issued for Taiwanese Patent Application No. 111145616 and English translation of the Search Report.

(56) References Cited

OTHER PUBLICATIONS

International Search Report and Written Opinion mailed Apr. 17, 2025 in PCT/US2024/061771, 12 pages.

* cited by examiner

BARRIER DRAPE ADAPTERS FOR ROBOTIC SURGICAL SYSTEMS

CROSS-REFERENCE TO RELATED APPLICATIONS

This application is a continuation of International Patent Application No. PCT/US2022/051262 filed Nov. 29, 2022, which claims priority to and the benefit of U.S. Provisional Application No. 63/284,289 filed Nov. 30, 2021, the entire contents of which are herein incorporated by reference in their entirety.

FIELD

This disclosure relates to robotic surgical systems, e.g., for minimally invasive surgery including, but not limited to, endoluminal and single-site surgery.

BACKGROUND

Minimally invasive surgery such as endoluminal and single-site robotic surgery offer significant advantages versus traditional robotic surgery. For example, in endoluminal robotic surgery, no incision need be made to access difficult to access locations within a patient's natural lumen. This dramatically reduces and/or eliminates recovery time and improves procedural safety. A single-site system reduces incisions to a minimum single-site, which reduces an otherwise larger number of incisions to provide access for certain procedures.

Certain endoluminal and single-site robotic surgical systems have been proposed. Examples of such systems and related components can be found in U.S. Pat. No. 10,881,422, as well as U.S. Patent Application Nos. US20210322046, US20210322045, US20190117247, US20210275266, US20210267702, US20200107898, US20200397457, US202000397456, US20200315645, and US201962914226, all of the above being incorporated by reference herein in their entirety.

Conventional surgical robotics and systems have generally been considered satisfactory for their intended purpose. However, there is still a need in the art for improved robotic surgical systems, devices, methods, controls, and components, especially those configured for endoluminal and single-site surgery. The present disclosure provides improvements in such areas, for example.

SUMMARY

In accordance with at least one aspect of this disclosure, a controller adapter system for a robotic surgical instrument controller assembly can include an instrument controller having a housing and one or more controller actuators. The housing can be configured to receive a drape opening structure on the housing. The system can include an inner drape adapter configured to mount to the instrument controller and extend distally from the instrument controller. The inner drape adapter can include one or more adapter actuators configured to receive actuation from the one or more controller actuators at a proximal side thereof, and to transmit the actuation to a distal side thereof. The system can include an outer drape adapter configured to axially retain the inner drape adapter to the instrument controller. The outer drape adapter can be configured to sandwich the drape opening structure to the housing of the instrument controller.

The housing of the instrument controller can include a tiered shape having a proximal tier and a distal tier. The proximal tier can be configured to be a backstop for the drape opening structure. For example, the proximal tier can have a larger outer diameter than the distal tier.

The proximal tier can include one or more housing alignment features to receive one or more corresponding outer drape adapter alignment features of the outer drape adapter. The instrument controller can include a center post extending therefrom. The inner drape adapter can be configured to slide on to the center post axially to engage the instrument controller. The center post and/or the distal tier can include one or more controller orientation features. The inner drape adapter can include one or more corresponding adapter orientation features configured to mate with the one or more controller orientation features to require the inner drape adapter to slide onto the center post in one or more circumferential orientations to ensure proper mounting of the inner drape adapter to the instrument controller. In certain embodiments, the inner drape adapter can include one or more electrical connectors configured to contact one or more electrical connectors on the center post to create a pass through electrical and/or data connection.

In certain embodiments, the housing of the instrument controller can include a locking mechanism configured to axially lock the outer drape adapter to the housing. Any suitable locking system is contemplated herein.

In certain embodiments, the system can include a drape having the drape opening structure configured to mount on the housing of the instrument controller. The drape opening structure can be a rigid ring defining an opening through the drape. Any suitable shape for the drape opening structure, rigid or otherwise, is contemplated herein. The drape opening structure can include one or more openings to allow one or more outer drape adapter alignment features and/or one or more housing alignment features to pass through the drape opening structure to allow alignment and/or orientation of the outer drape adapter relative to the instrument controller.

In accordance with at least one aspect of this disclosure, a robotic surgical instrument controller assembly can include a housing for an instrument controller. The housing can be configured to receive a drape opening structure on the housing. The assembly can include an inner drape adapter configured to mount to the instrument controller and extend distally from the instrument controller. The inner drape adapter can include one or more adapter actuators configured to receive actuation from the one or more controller actuators at a proximal side thereof, and to transmit the actuation to a distal side thereof. The assembly can include an outer drape adapter configured to axially retain the inner drape adapter to the instrument controller. The outer drape adapter is configured to sandwich the drape opening structure to the housing of the instrument controller. The assembly can include any suitable portions of a controller adapter system (e.g., for retaining a drape) as disclosed herein, e.g., as described above.

In accordance with at least one aspect of this disclosure, a method of installing a drape to an instrument controller of a robotic surgical system can include inserting a portion of an instrument controller through a drape opening structure, attaching an inner drape adapter to the instrument controller, and placing an outer drape adapter axially over the inner drape adapter to engage the outer drape adapter to a housing of the instrument controller to sandwich the drape between the outer drape adapter and the housing of the instrument controller. In certain embodiments, the method can include locking the outer drape adapter to the housing by rotating a latch in a first direction.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
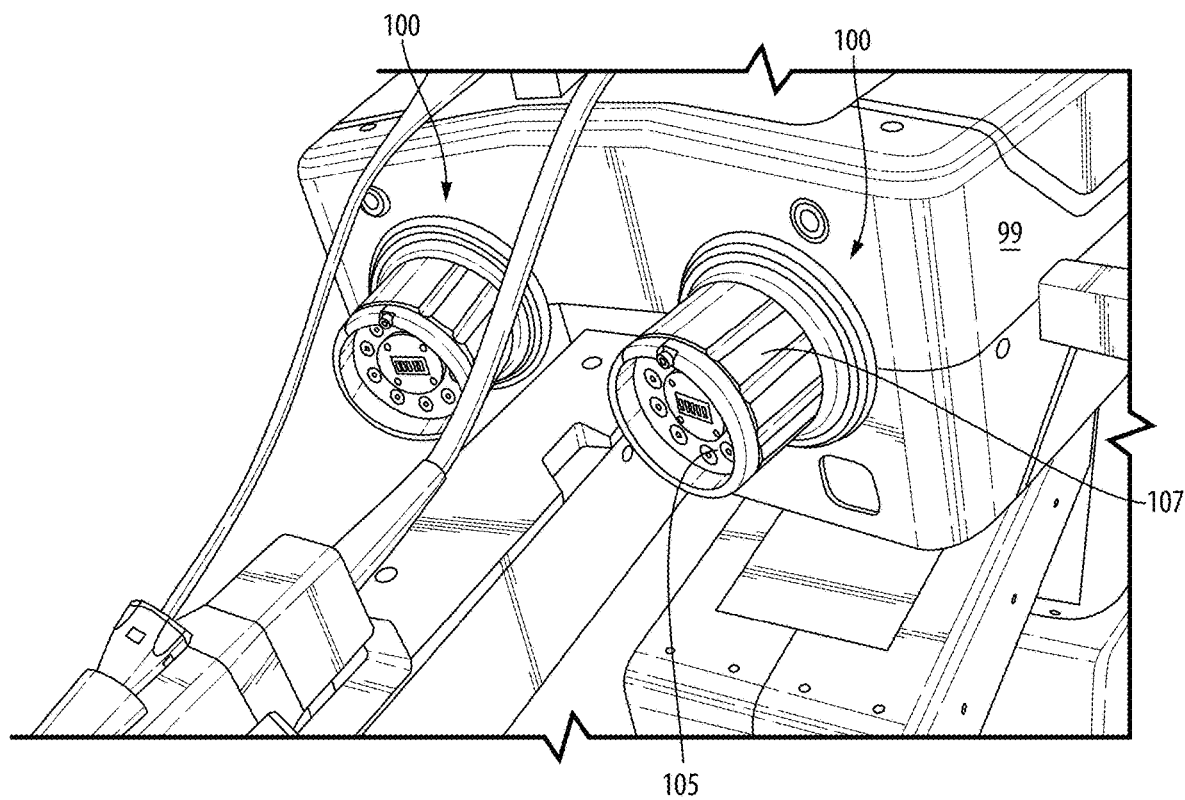
FIG. 1 is a perspective view of an embodiment of a system in accordance with this disclosure, shown attached to a positioning system of a patient console of a robotic surgical system, also shown without a drape attached.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-8F.

Figure 2A:
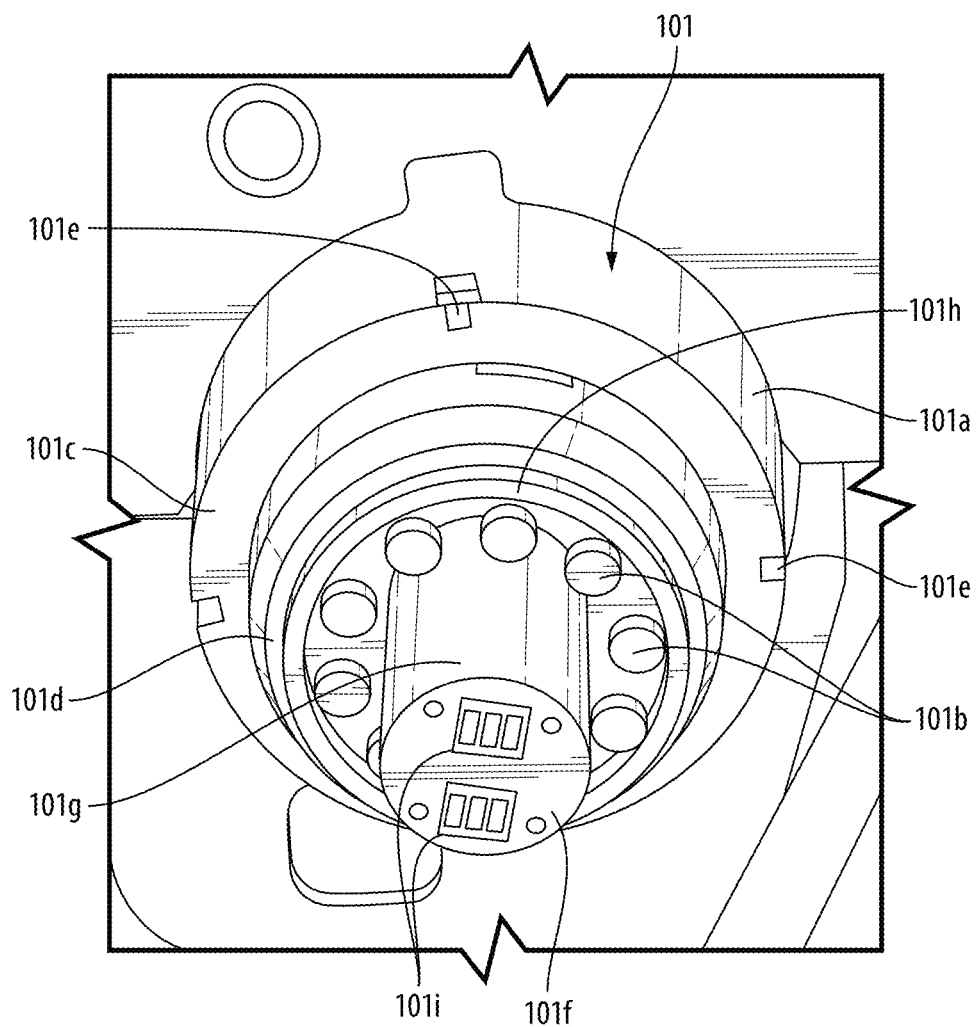
FIG. 2A is a perspective view of an embodiment of an instrument controller in accordance with this disclosure.
Figure 2B:
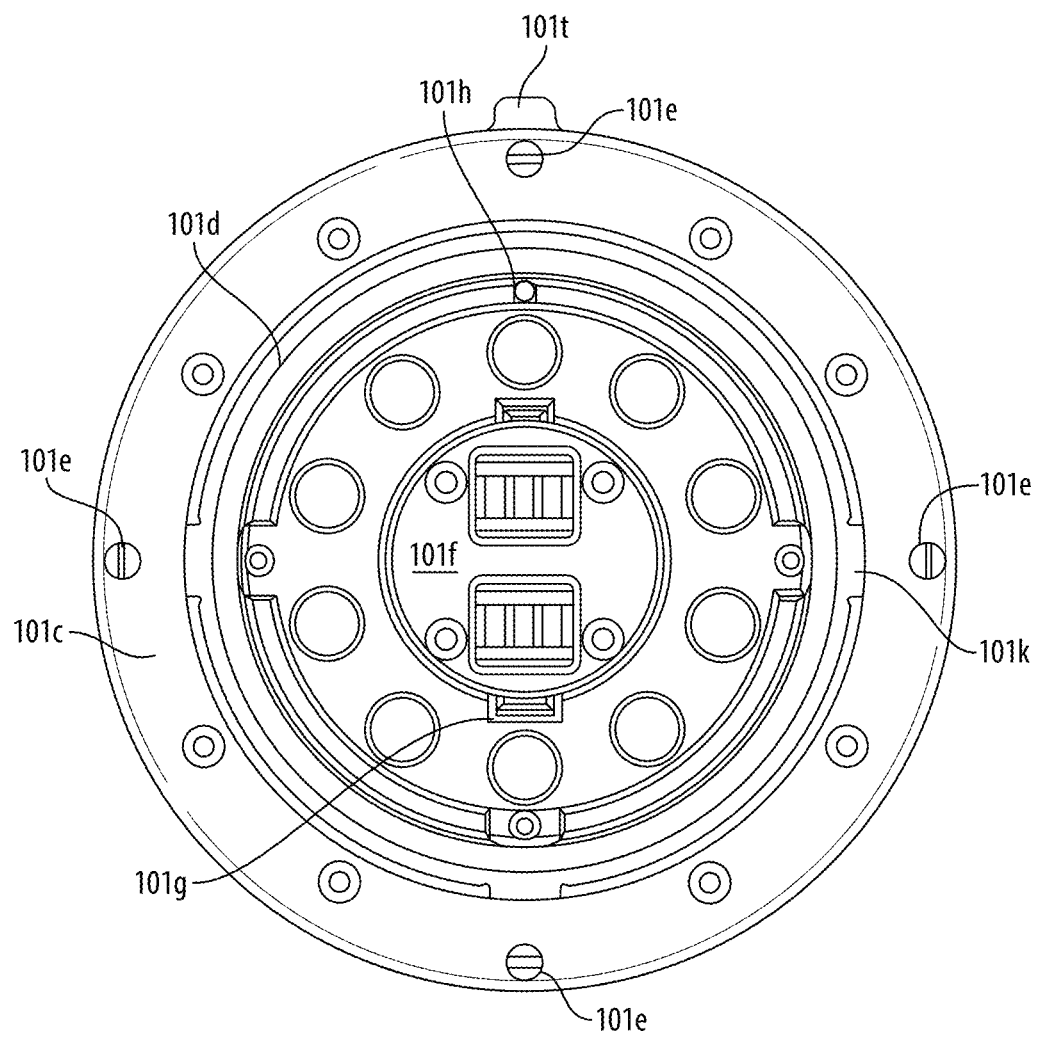
FIG. 2B is an elevation view of the embodiment of FIG. 2A.
Figure 2C:
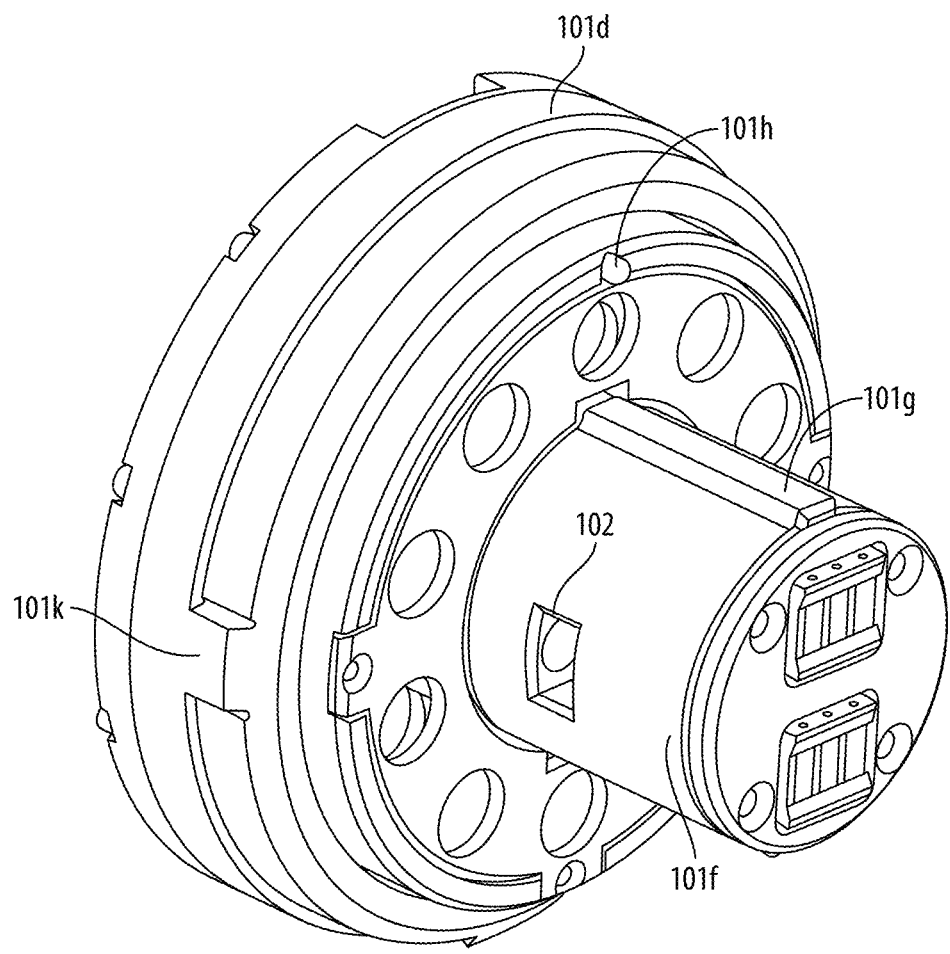
FIG. 2C is a perspective view of the adapter interface of the embodiment of FIG. 2A.
Figure 2D:
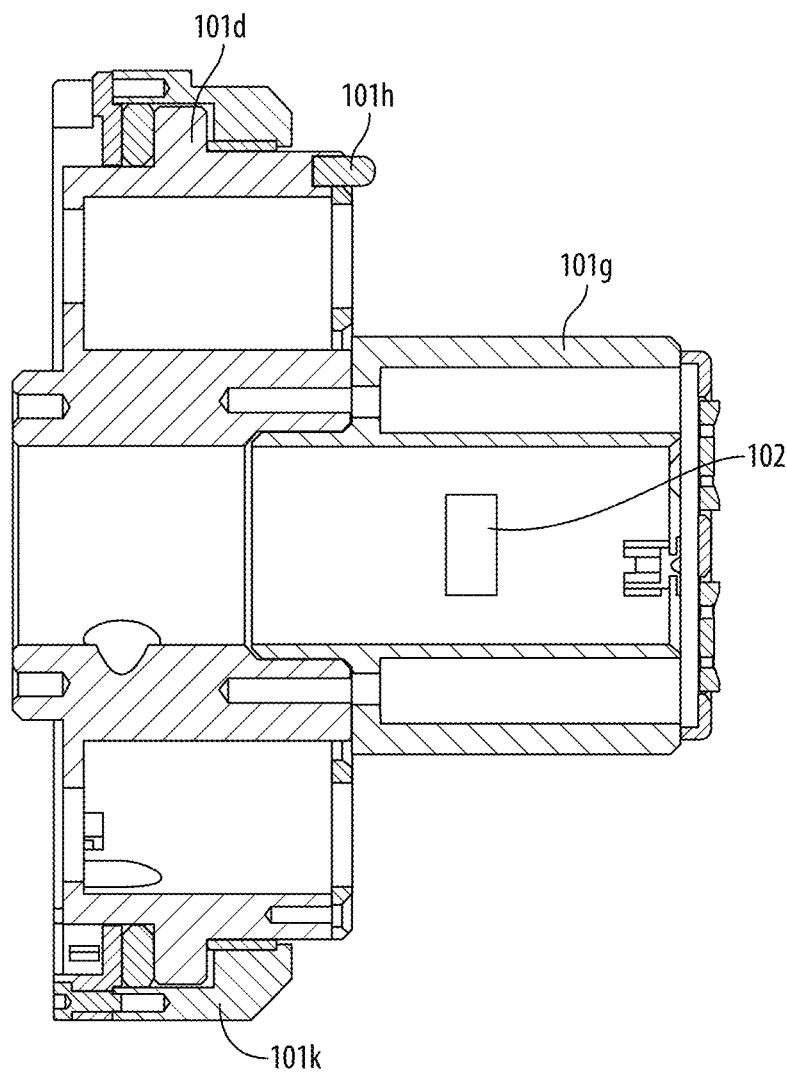
FIG. 2D is a cross-sectional view of the adapter interface of the embodiment of FIG. 2A.
Figure 5:
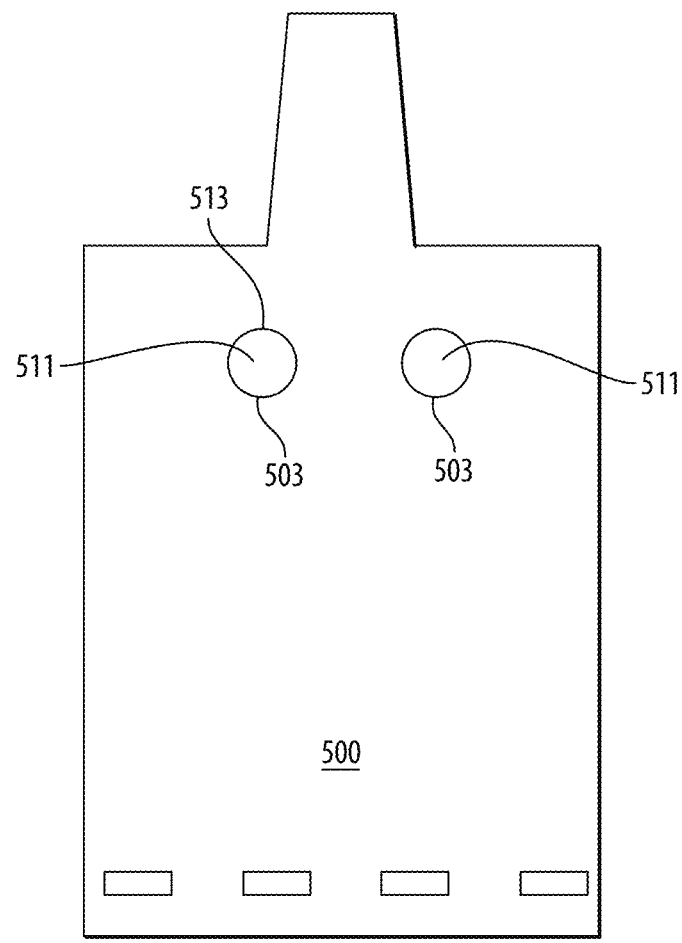
FIG. 5 is a plan view of an embodiment of a drape in accordance with this disclosure, shown configured for the embodiment of FIG. 1.

In accordance with at least one aspect of this disclosure, referring to FIGS. 1-2D, a controller adapter system 100 for a robotic surgical instrument controller assembly 99 can include an instrument controller 101 having a housing 101a and one or more controller actuators 101b. The housing 101a can be configured to receive a drape opening structure (e.g., drape opening structure 503 as shown in FIG. 5) on the housing 101a.

The housing 101a of the instrument controller 101 can include a tiered shape (e.g., as shown in FIG. 2A) having a proximal tier 101c (e.g., an outer adapter interface) and a distal tier 101d (e.g., an inner and/or outer adapter interface). The proximal tier 101c can be configured to be a backstop for the drape opening structure 503. For example, the proximal tier 101c can have a larger outer diameter than the distal tier 101d. Any suitable number of tiers are contemplated herein.

Figure 3A:
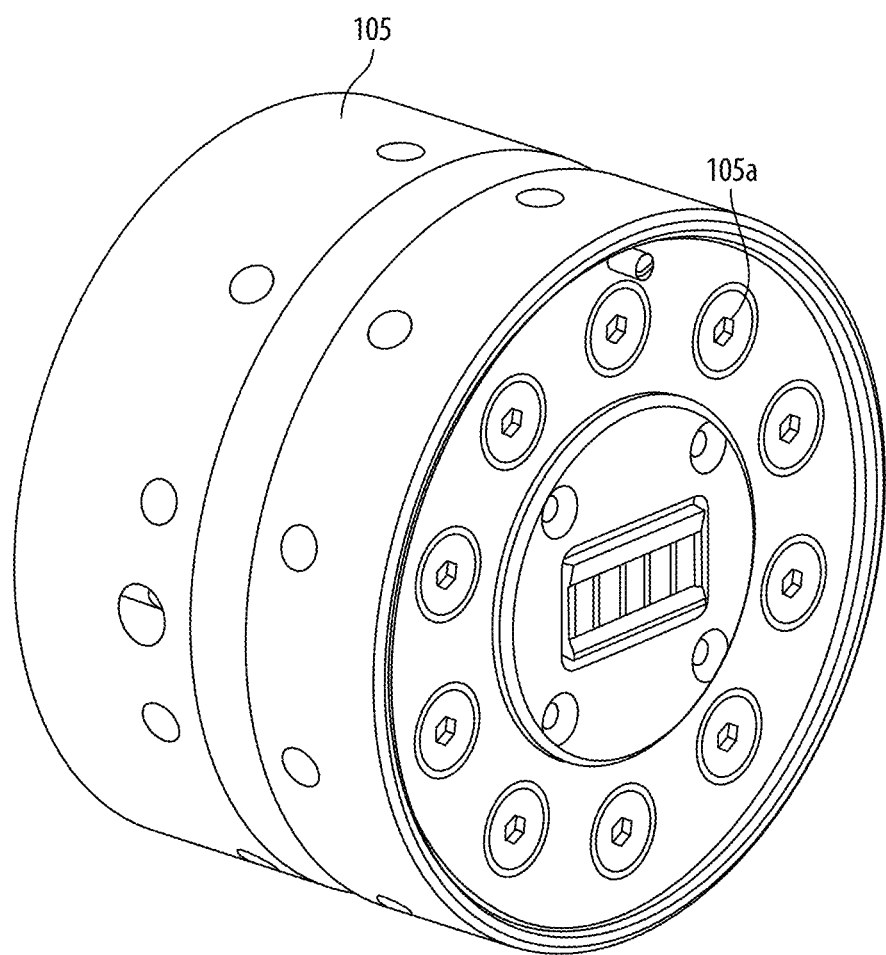
FIG. 3A is perspective front view of an embodiment of an inner drape adapter in accordance with this disclosure.
Figure 3B:
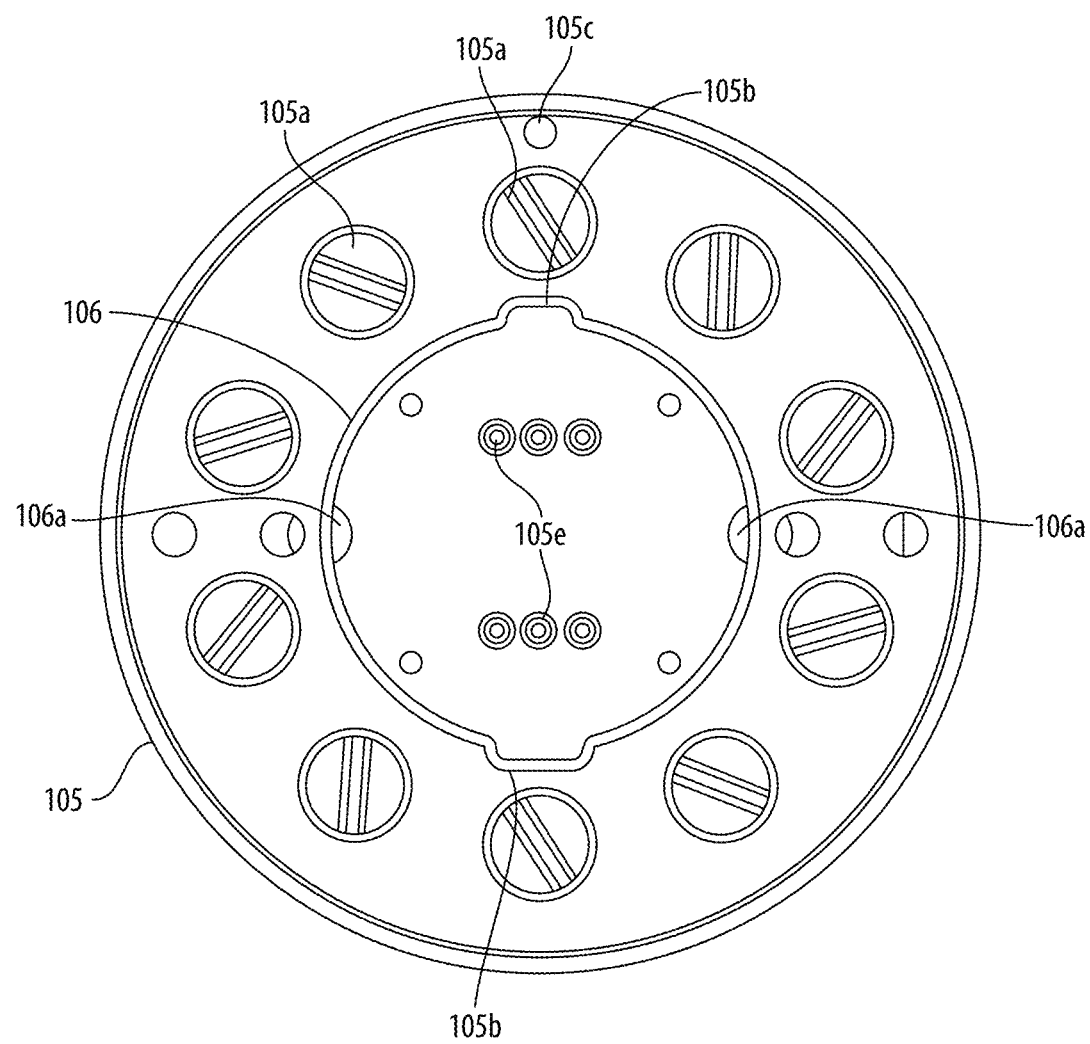
FIG. 3B is a rear plan view of the embodiment of FIG. 3A.

Referring additionally to FIGS. 3A and 3B, the system 100 can include an inner drape adapter 105 configured to mount to the instrument controller 101 and extend distally from the instrument controller 101. The inner drape adapter 105 can include one or more adapter actuators 105a configured to receive actuation from the one or more controller actuators 101b at a proximal side thereof (e.g., as shown in FIG. 3B), and to transmit the actuation to a distal side thereof (e.g., as shown in FIG. 3A). The adapter actuators 105a can be posts that are slidably disposed within one or more channels of the inner drape adapter 105. The adapter actuators 105a can be retained within one or more channels in any suitable manner (e.g., via radial pins positioned in a slot of each adapter actuator 105a). The adapter actuators 105a can act as extenders for the controller actuators 101b, for example, to directly transmit force (e.g., a pushing motion only). The adapter actuators 105a can be configured to apply only a pushing force to actuators of a medical instrument attached thereto (e.g., shown being attached in FIG. 8F).

In certain embodiments, the inner drape adapter 105 can include a center aperture 106 defined therein. The center aperture 106 can include and retain one or more plungers 106a (e.g., ball plungers as shown) disposed therein and biased to the radially inward direction (e.g., with a radial spring).

The system 100 can include an outer drape adapter 107 configured to axially retain the inner drape adapter 105 to the instrument controller. In certain embodiments, the outer drape adapter 107 can be configured to sandwich the drape opening structure 503 to the housing 101a of the instrument controller 101 (e.g., compressing the drape opening structure 503 therebetween). For example, the outer drape adapter 107 can include a tiered shape having proximal portion 110a and a distal portion 110b. The distal portion 110b can include a cylindrical shape corresponding to the shape of the inner drape adapter 105, for example. The distal portion 110b can include one or more nubs 114 defined on an inner diameter thereof which extend inwardly of an outer diameter of the inner drape adapter 105 to axially trap the inner drape adapter 105.

Figure 4A:
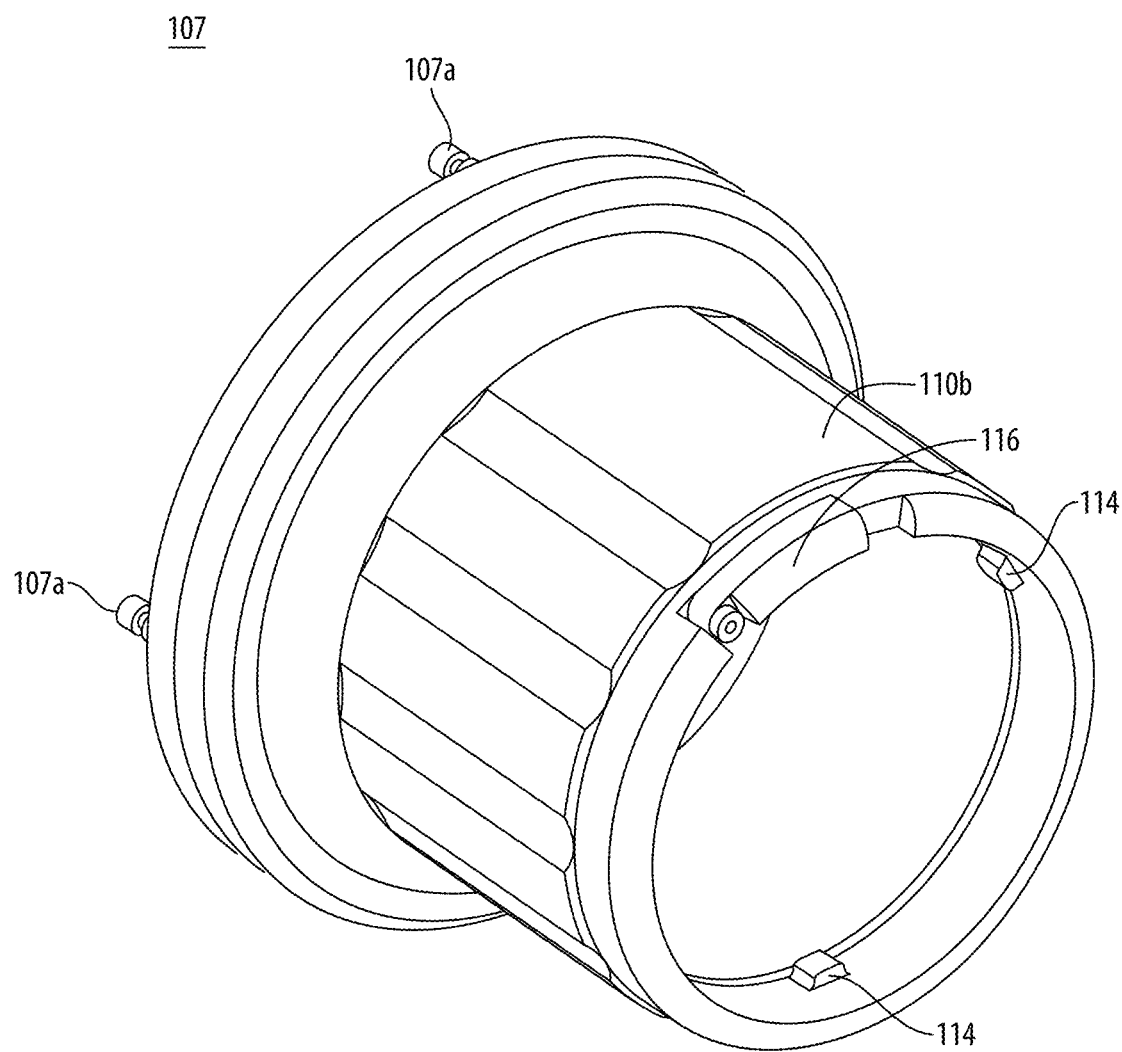
FIG. 4A is a perspective view of an embodiment of an outer drape adapter in accordance with this disclosure.
Figure 4B:
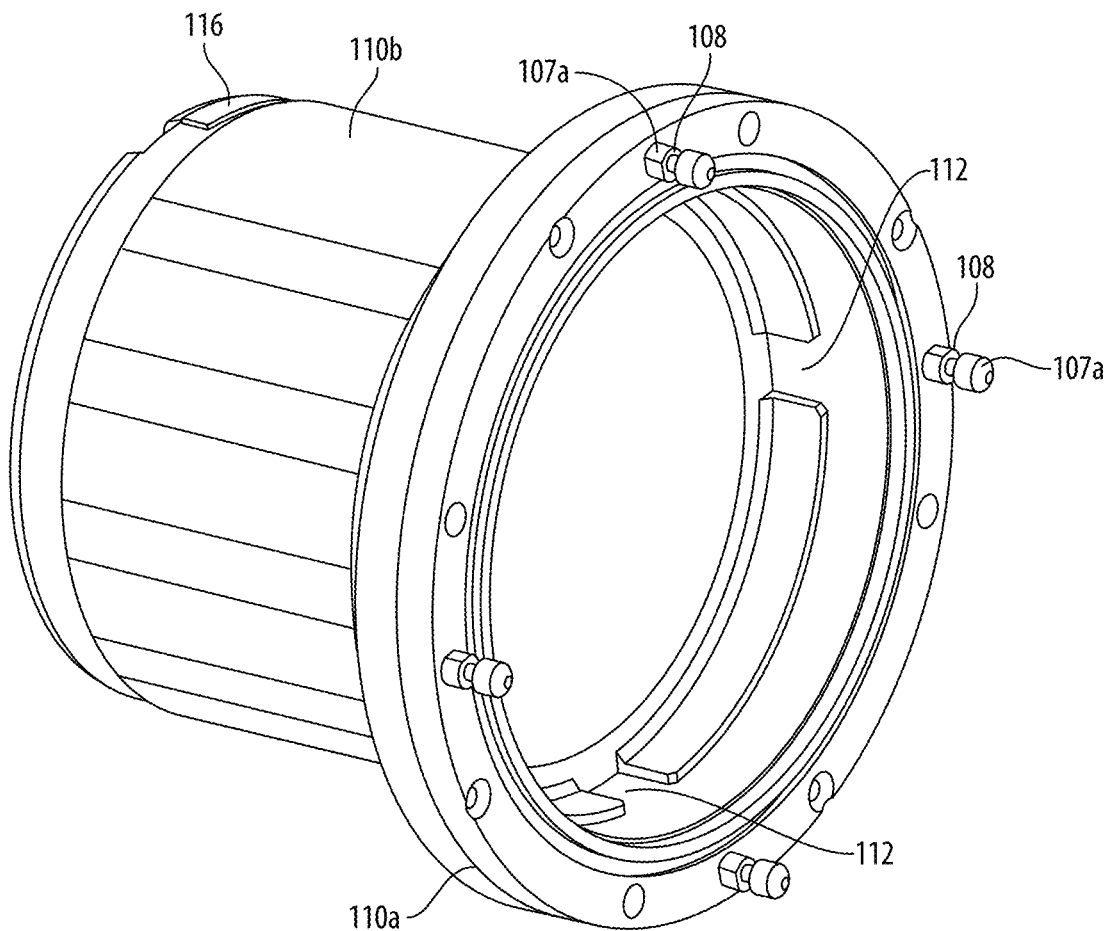
FIG. 4B is a rear side perspective view of the embodiment of FIG. 4A.
Figure 4C:
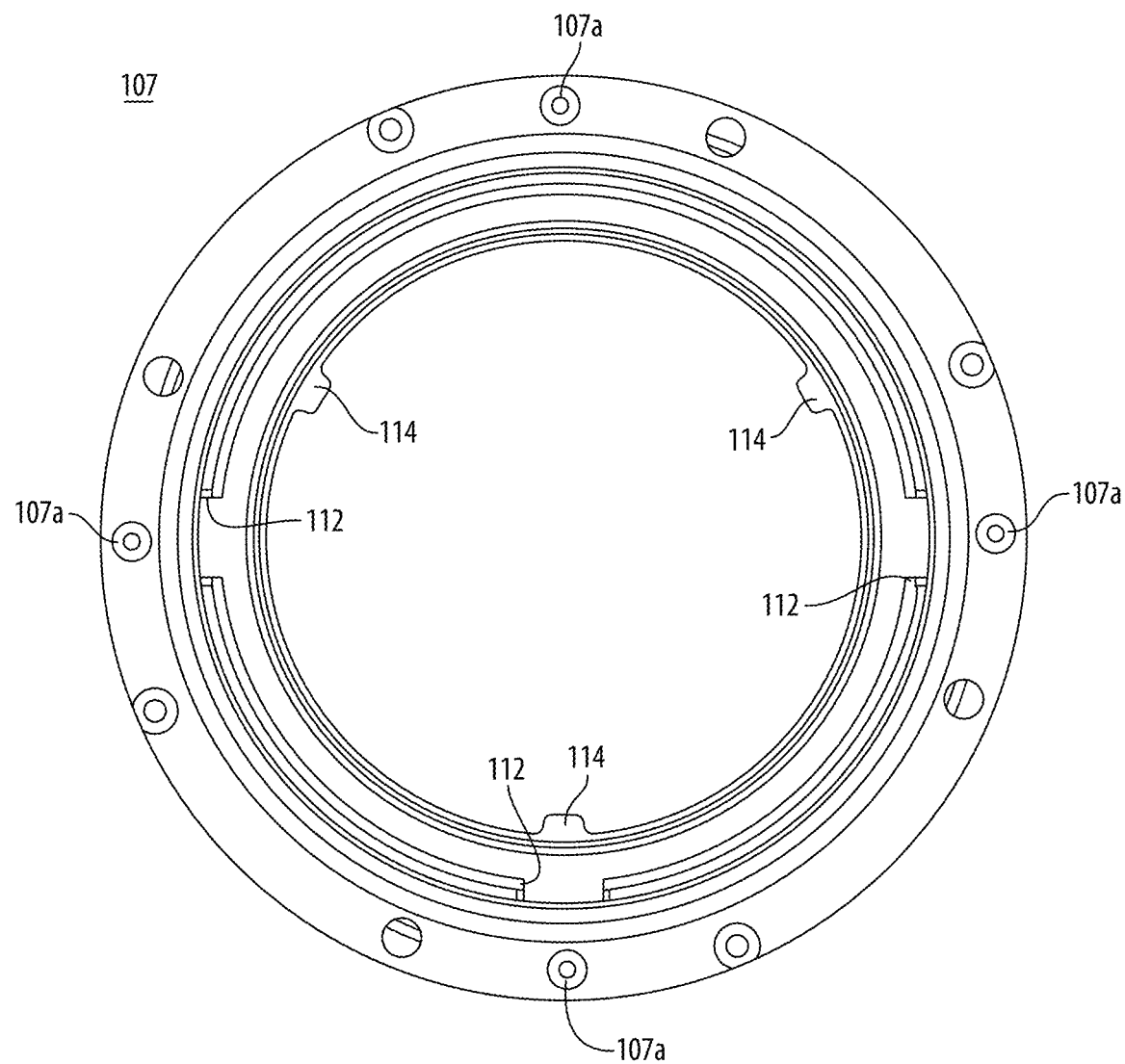
FIG. 4C is a rear elevation view of the embodiment of FIG. 4A.

Referring additionally to FIGS. 4A, 4B, and 4C, the proximal tier 101c can include one or more housing alignment features 101e (e.g., four holes), 101k (e.g., three ribs) to receive one or more corresponding outer drape adapter alignment features 107a (e.g., pins), 112 (e.g., slots to receive ribs 101k) of the outer drape adapter 107. The one or more adapter alignment features 107a can include a pin shape and have a lock channel 108 defined therein to allow trapping of a proximal end of the alignment features 107a. Any suitable number of alignment features in any suitable positions (e.g., four arranged in a cross pattern as shown) are contemplated herein. The proximal tier 101c can also include a tab 101t to be able to rotate the proximal tier 101t to trap the one or more adapter alignment features 107a by rotating the proximal tier 101c or other suitable component (e.g., a ring having an inner diameter protrusion that extends radially inward) into the lock channel 108 of each feature 107a, for example. This can axially retain the outer adapter 107. In certain embodiments, the tab 101t is connected to a rotating ring proximal of a distal face of the proximal tier 101c. Any other suitable mechanical engagement is contemplated herein.

The instrument controller 101 can include a center post 101f extending therefrom (e.g., from the distal tier 101d). The inner drape adapter 105 can be configured receive the center post 101f in the center aperture 106 to allow the inner drape adapter to slide onto the center post 101f axially to engage the instrument controller 101. The one or more plungers 106a can be depressed by the center post 101f as the center post 101f is inserted into the inner drape adapter 105. The center post 101f can include one or more plunger openings 102 configured to receive the one or more plungers 106a once sufficiently advanced onto the center post 101f. The plungers 106a can move from a depressed position to an inward position to extend into the one or more plunger openings 102. This can provide a resistance to removal of the inner drape adapter 105 from the distal tier 101d until intended.

The center post 101f and/or the distal tier 101d can include one or more controller orientation features (e.g., pin 101h, radial protrusion 101g, ribs 101k). The inner drape adapter 105 can include one or more corresponding adapter orientation features (e.g., slots 105b corresponding to protrusions 101g; pin hole 105c corresponding to pin 101h) configured to mate with the one or more controller orientation features (e.g., 101h, 101g) to require the inner drape adapter 105 to slide onto the center post 101f in one or more circumferential orientations to ensure proper mounting of the inner drape adapter 105 to the instrument controller 101. In certain embodiments, the inner drape adapter 105 can include one or more electrical connectors 105e configured to contact one or more electrical connectors 101i on the center post 101f to create a pass through electrical and/or data connection (e.g., to output a signal from front electrical connector 105f).

The outer drape adapter 107 can include a latch 116 disposed at a distal end thereof. The latch 116 can be rotatably attached to the distal portion 110b to open and close. The latch 116 can provide an emergency release to remove an instrument from the assembly. Any other suitable latching and/or emergency release is contemplated herein.

Figure 8A:
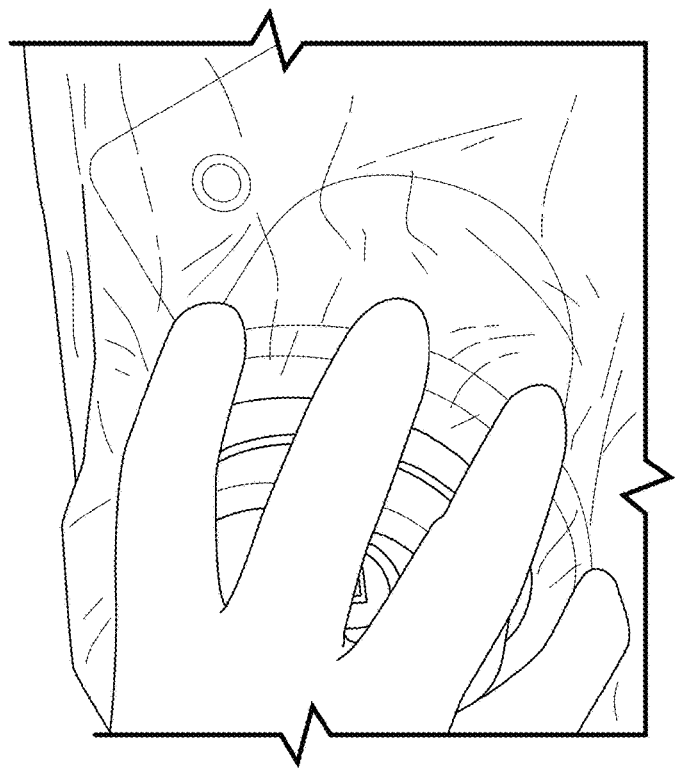
FIG. 8A illustrates a portion of an embodiment of a method in accordance with this disclosure.
Figure 8B:
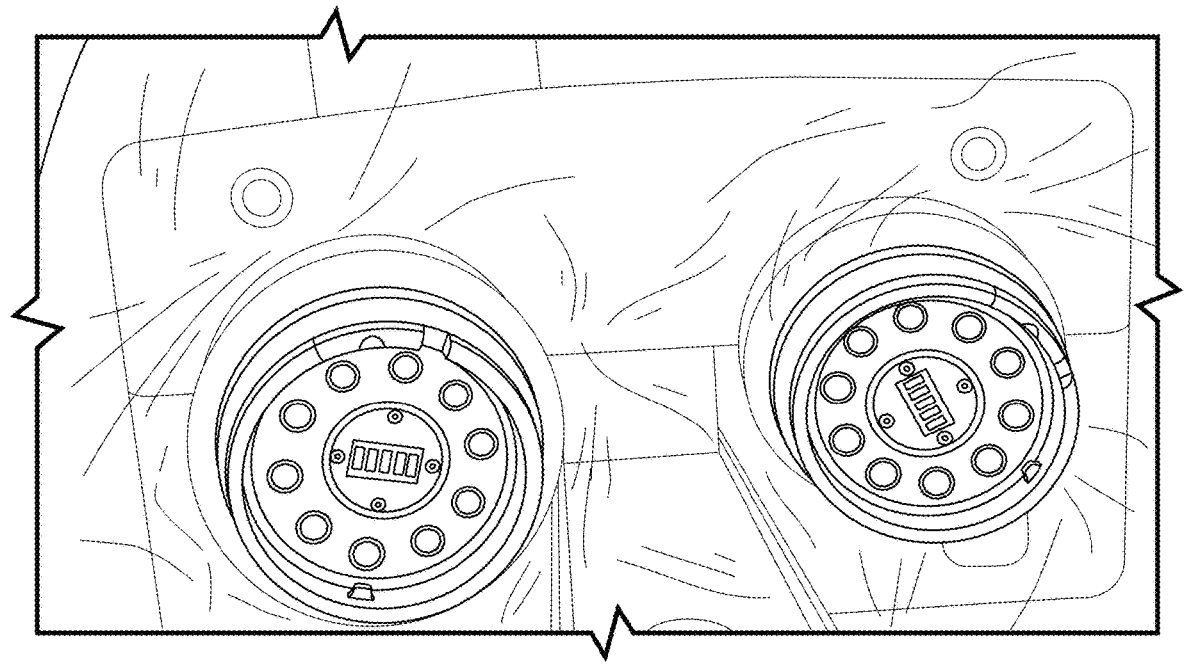
FIG. 8B illustrates a portion of an embodiment of a method in accordance with this disclosure.
Figure 8C:
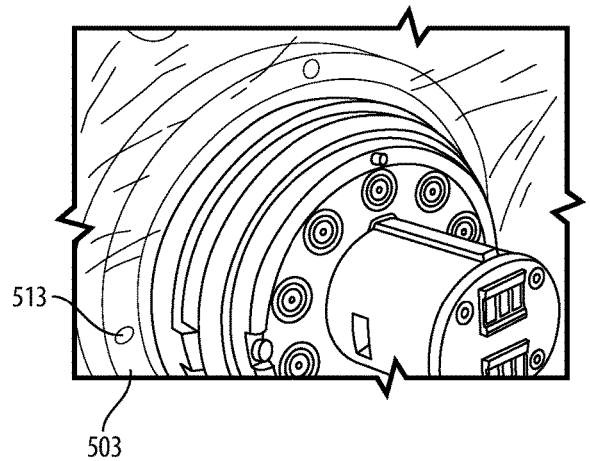
FIG. 8C illustrates a portion of an embodiment of a method in accordance with this disclosure.
Figure 8D:
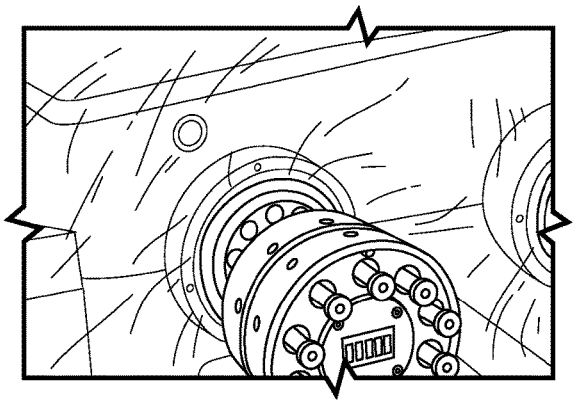
FIG. 8D illustrates a portion of an embodiment of a method in accordance with this disclosure.
Figure 8E:
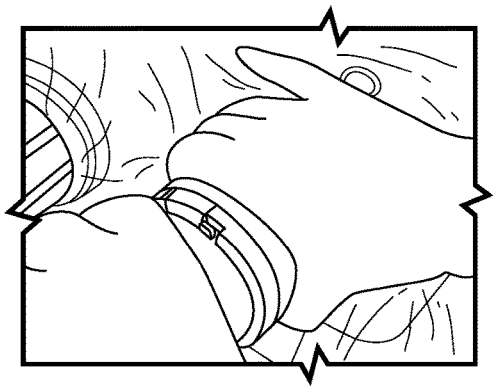
FIG. 8E illustrates a portion of an embodiment of a method in accordance with this disclosure.
Figure 8F:
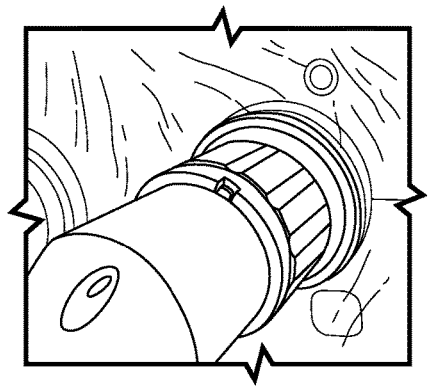
FIG. 8F illustrates a portion of an embodiment of a method in accordance with this disclosure.

In certain embodiments, referring additionally to FIGS. 5, the system 100 can include a drape 500 having the drape opening structure 503 configured to mount on the housing 101a of the instrument controller 101. The drape opening structure 503 can be a rigid ring (e.g., made of plastic) defining an opening through the drape 511. Any suitable shape (e.g., circular as shown, or any other suitable shape to mate to the housing 101a) for the drape opening structure 503, rigid or otherwise (e.g., soft silicone), is contemplated herein. The drape opening structure 503 can include one or more openings 513 (e.g., as best shown in FIG. 8C) to allow one or more outer drape adapter alignment features 107a and/or one or more housing alignment features to pass through the drape opening structure 503 to allow alignment and/or orientation of the outer drape adapter 107 relative to the instrument controller 101.

Figure 6A:
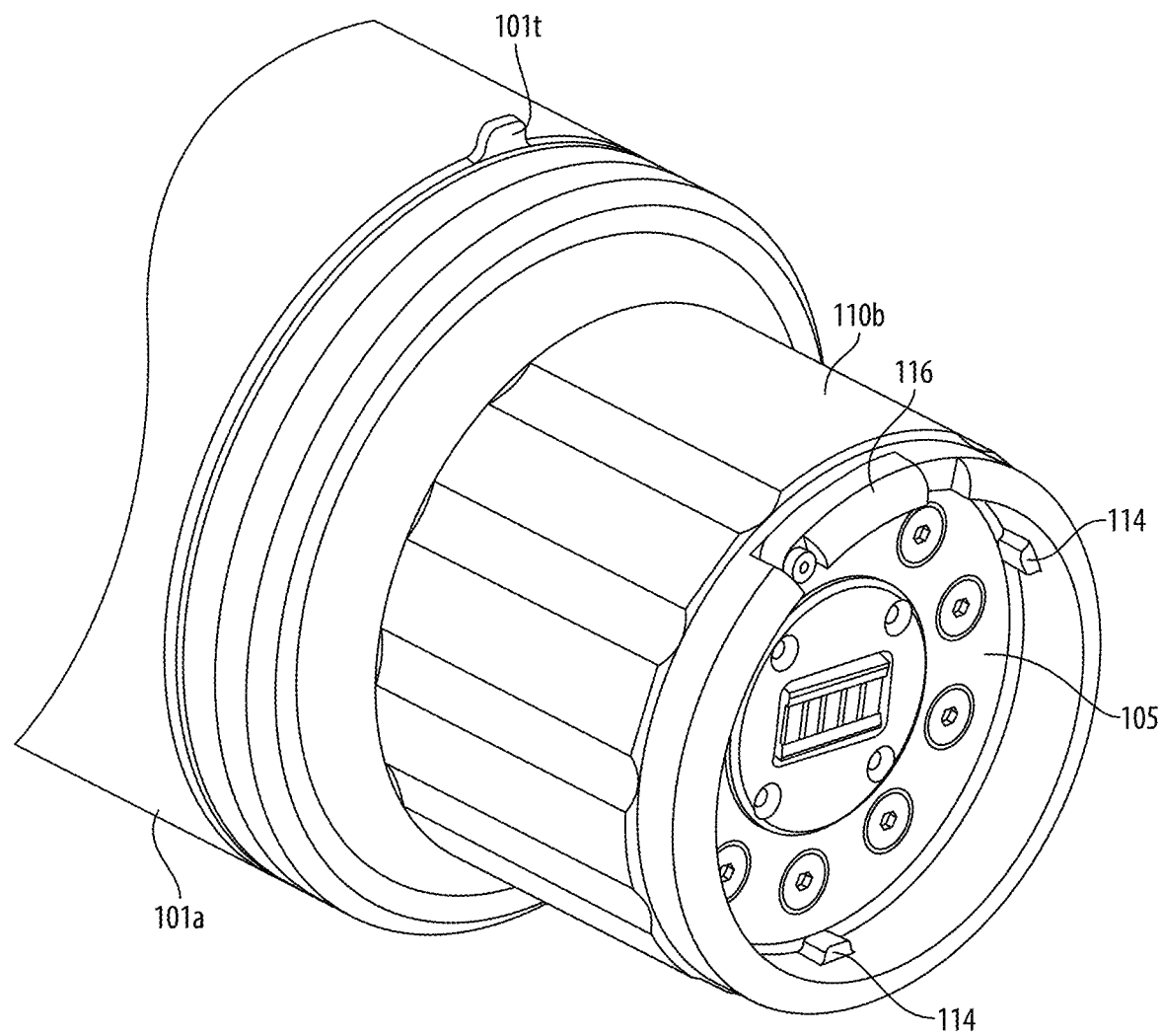
FIG. 6A is a perspective view of the embodiment of a system as shown in FIG. 1.
Figure 6B:
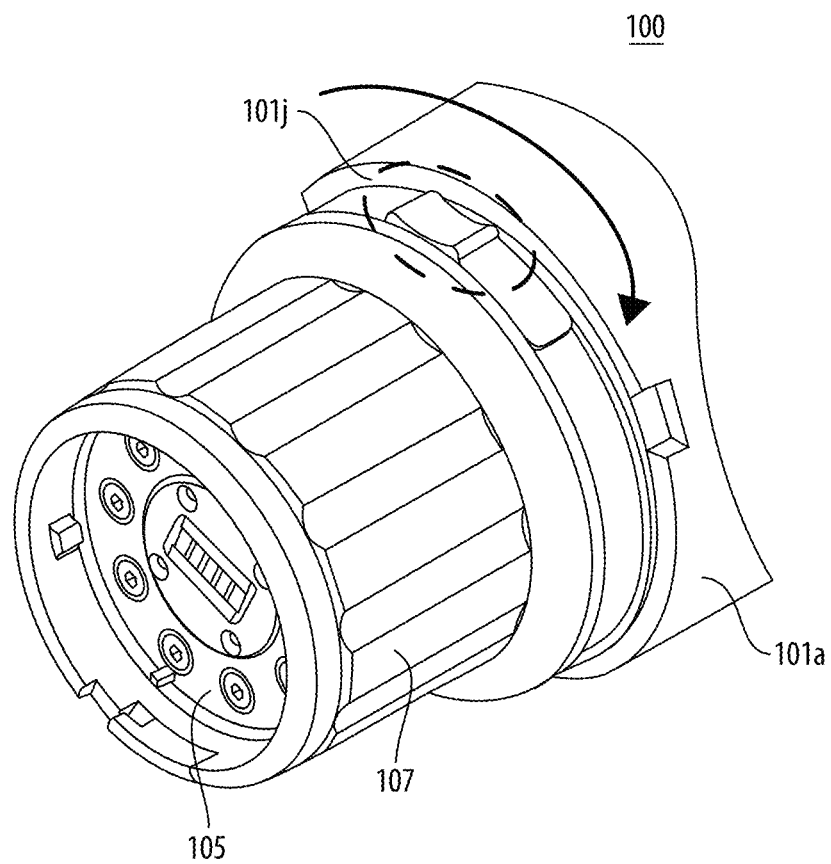
FIG. 6B is a perspective view of another embodiment of a system as shown in FIG. 1.
Figure 7A:
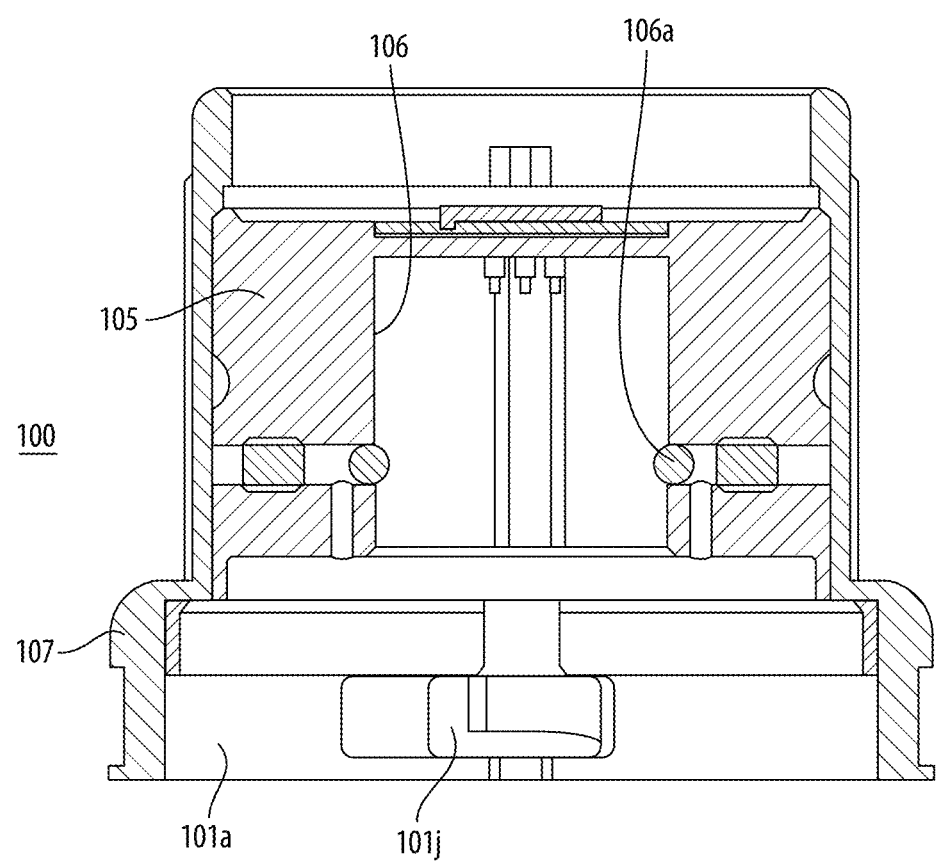
FIG. 7A is a schematic partially cross-sectional view of the embodiment of FIG. 6A, shown in the locked position.
Figure 7B:
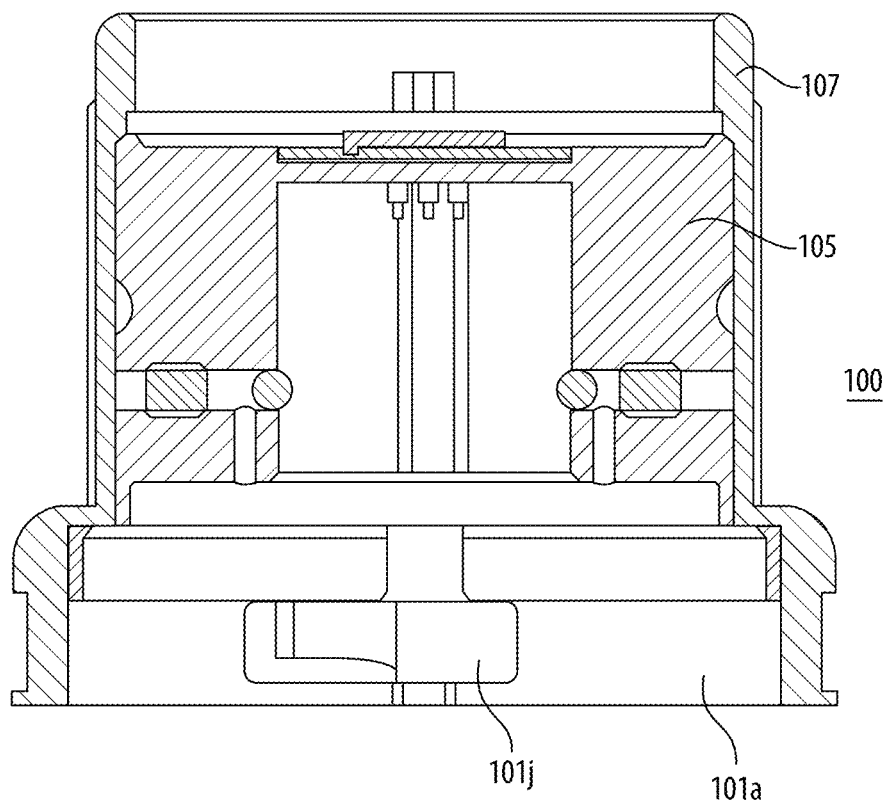
FIG. 7B is a schematic partially cross-sectional view of the embodiment of FIG. 6A, shown in the locked position.

In certain embodiments, referring additionally to FIGS. 6A and 6B, as well as FIGS. 7A and 7B, the housing 101a of the instrument controller 101 can include a locking mechanism 101j configured to axially lock the outer drape adapter 107 to the housing 101a. As shown, the locking mechanism 101j can include a rotate lock such that rotation of the outer drape adapter 107 latches the outer drape adapter 107 to the housing 101a. Any suitable locking system is contemplated herein. In FIG. 6A, one or more outer drape adapter alignment features 107a can be provided to be secured to a translation module of the instrument controller to sandwich the drape opening structure to the housing of the instrument controller; thus, the rotation module of the instrument controller rotates in relation to the circumferential surface of the one or more outer drape adapter alignment features 107a. In FIG. 6B, the outer drape adaptor 107 without one or more outer drape adapter alignment features can be directly secured to a rotation module provided at a distal end of the instrument controller.

Figure 9A:
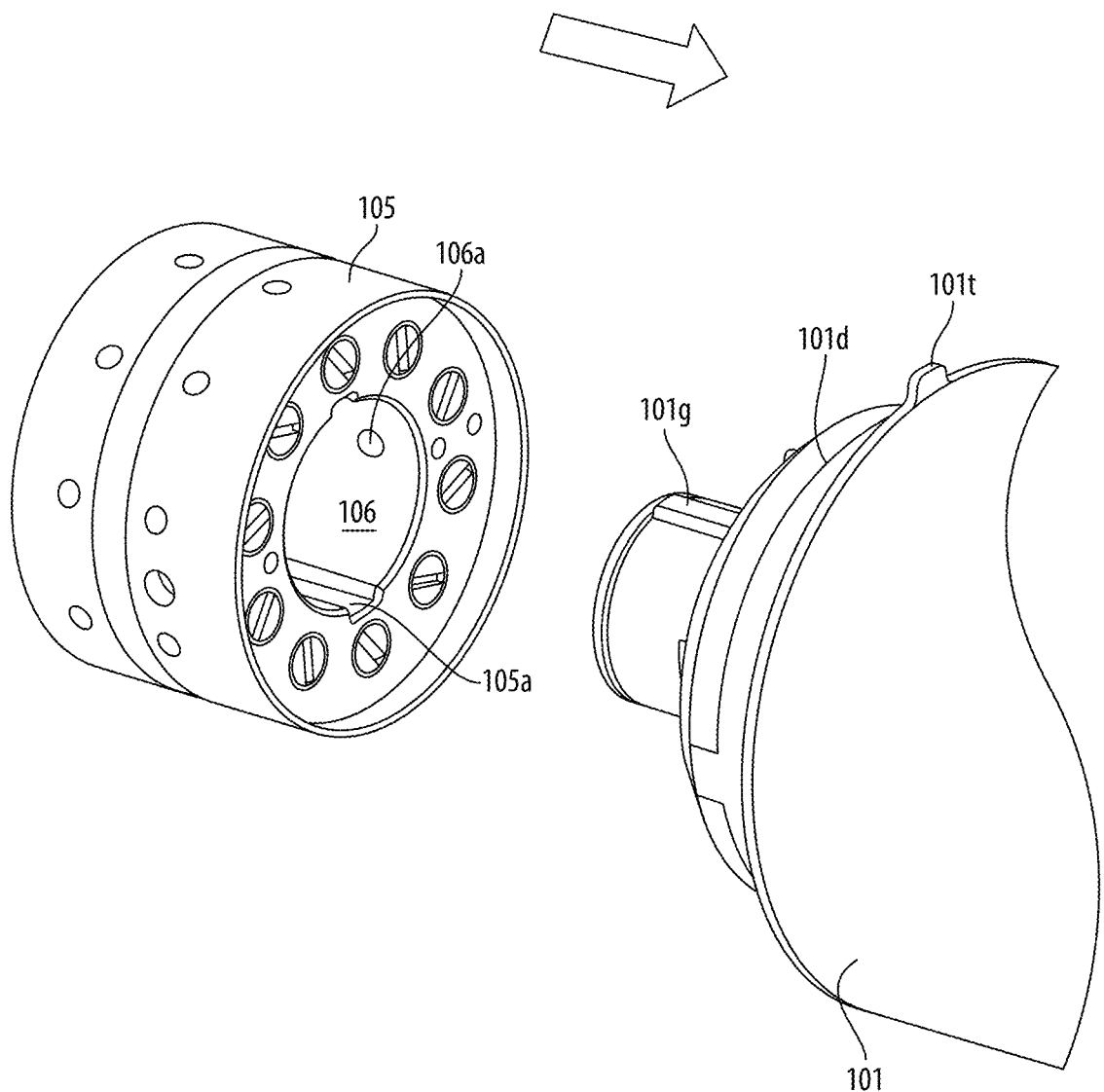
FIG. 9A shows insertion of an inner drape adapter onto an adapter interface of an instrument controller.
Figure 9B:
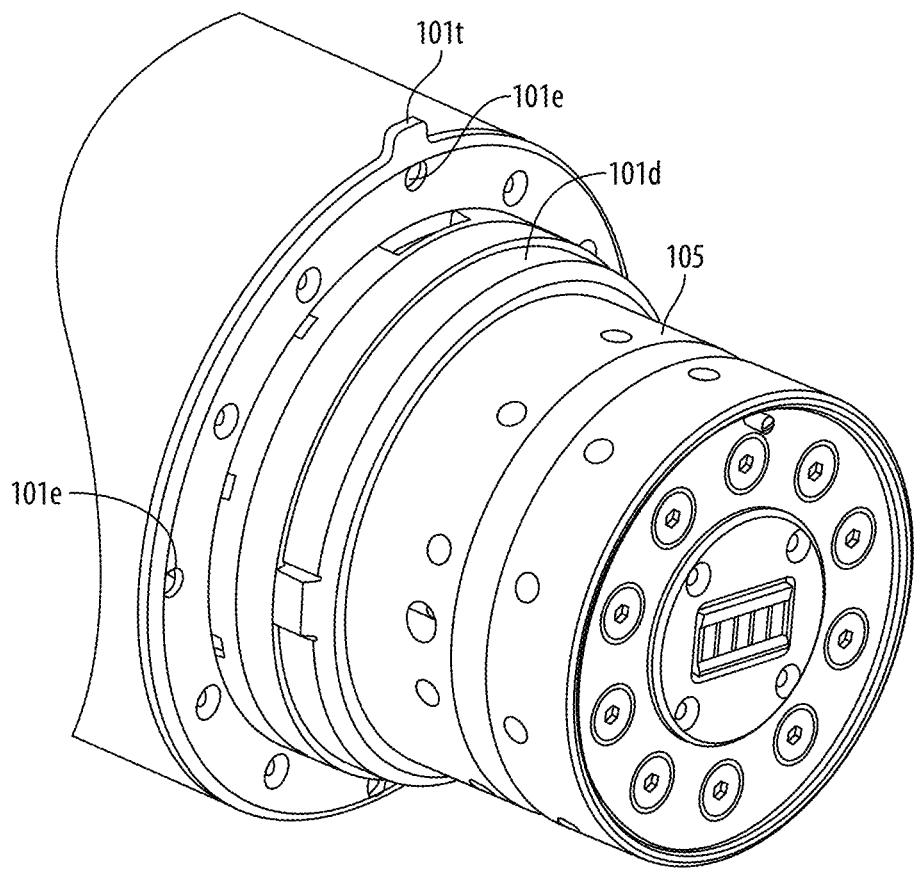
FIG. 9B shows the inner drape adapter of FIG. 9A disposed on the adapter interface of FIG. 9A.
Figure 9C:
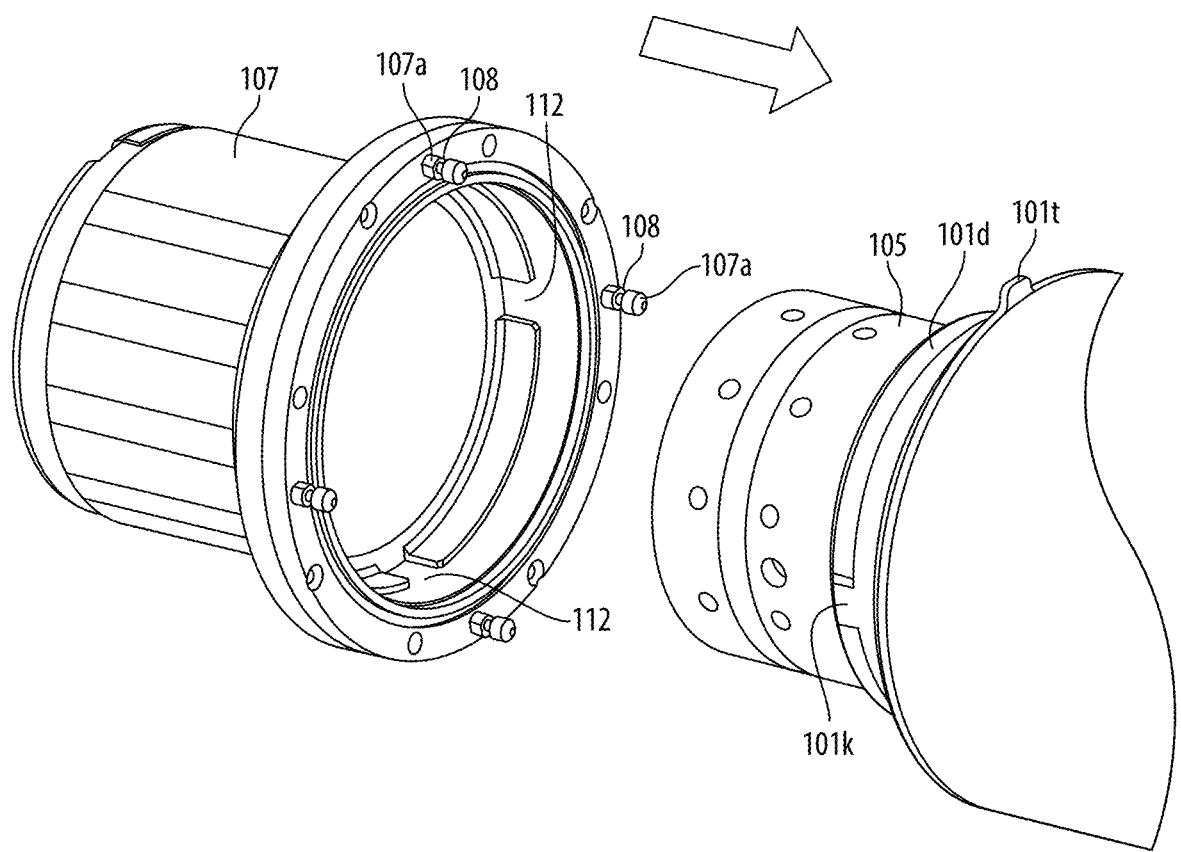
FIG. 9C shows insertion of an outer drape adapter over the inner drape adapter to connect to the instrument controller and trap the inner drape adapter.
Figure 9D:
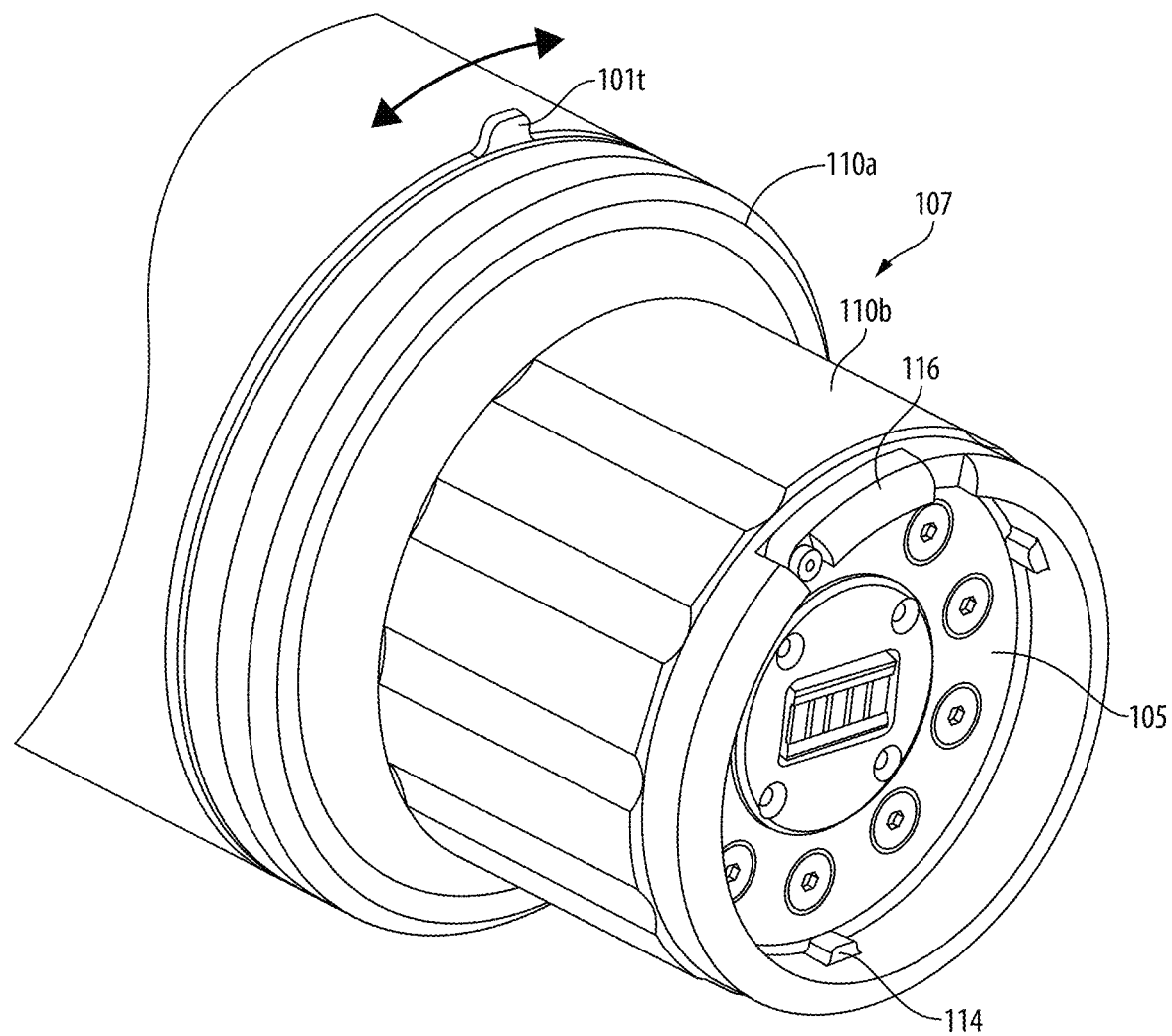
FIG. 9D shows the inner drape adapter of FIG. 9C disposed over the inner drape adapter.

FIG. 9A shows insertion of an inner drape adapter 105 onto the housing 101. FIG. 9B shows the inner drape adapter 105 disposed on the housing 101. FIG. 9C shows insertion of an outer drape adapter 107 over the inner drape adapter 105 to connect to the instrument controller housing 101 and trap the inner drape adapter 105. FIG. 9D shows the outer drape adapter 107 disposed over the inner drape adapter 105, and latching of the outer drape adapter 107 by rotating the tab 101t.

Figure 9E:
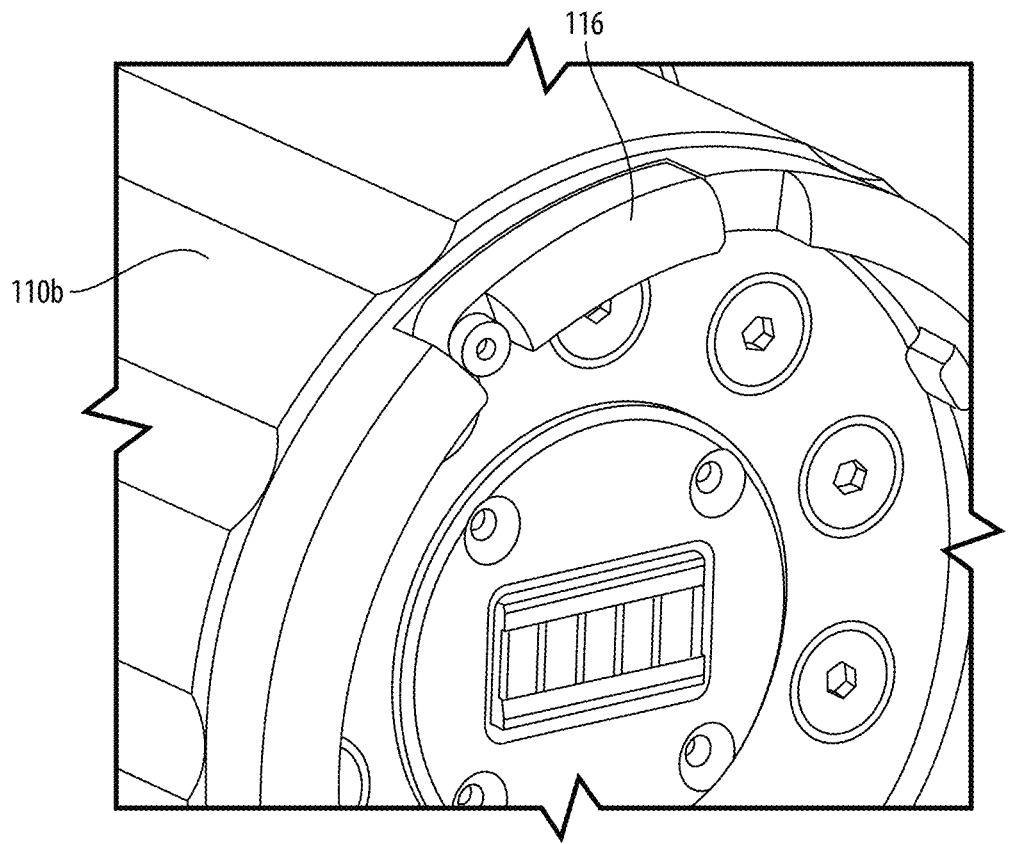
FIG. 9E shows an instrument latch in a closed state.
Figure 9F:
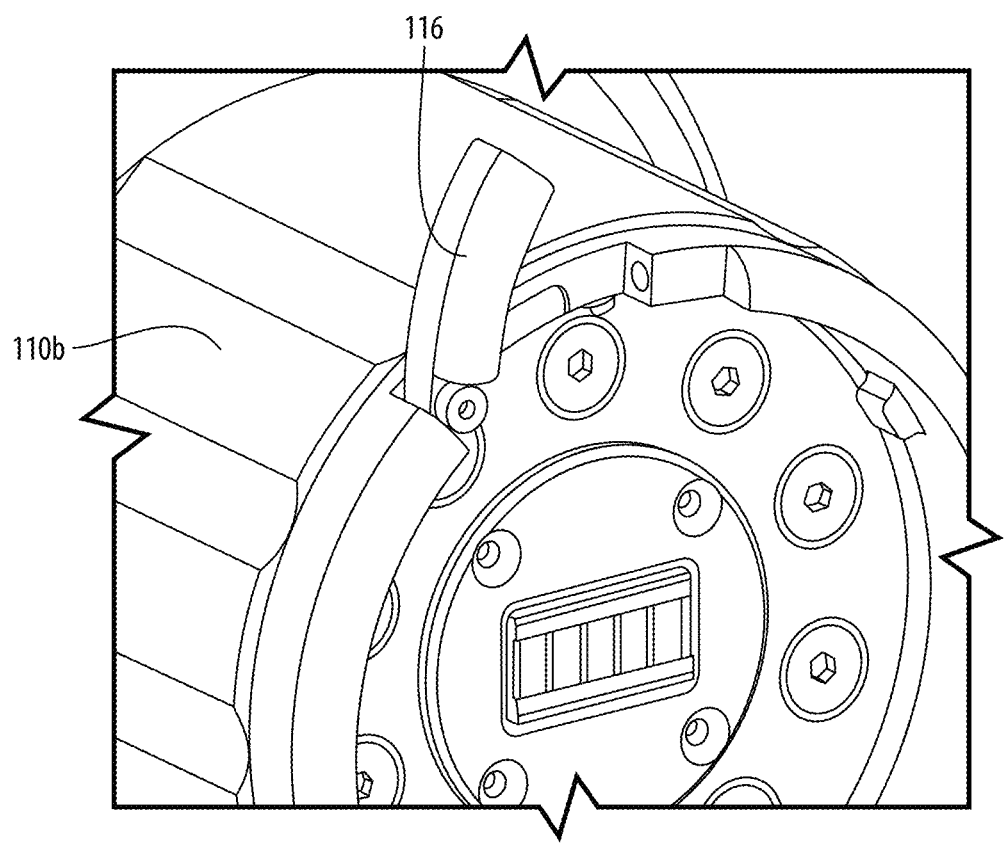
FIG. 9F shows the instrument latch of FIG. 9F in an open state.

FIG. 9E shows an instrument latch in a closed state, and FIG. 9F shows the instrument latch of FIG. 9F in an open state (e.g., for emergency removal of the instrument from the assembly 100). For example, a user can push the latch 116 upward and the latch 116 can pop up. This can allow the drape adapter to be rotated clockwise without controller translation movement, and the instrument can be detached after the drape adapter is rotated.

In accordance with at least one aspect of this disclosure, a robotic surgical instrument controller assembly 99 can include a housing 101a for an instrument controller 101. The housing 101a can be configured to receive a drape opening structure 503 on the housing 101a. The assembly 99 can include an inner drape adapter 105 configured to mount to the instrument controller 101 and extend distally from the instrument controller 101. The inner drape adapter 105 can include one or more adapter actuators 105a configured to receive actuation from the one or more controller actuators 101b at a proximal side thereof, and to transmit the actuation to a distal side thereof. The assembly 99 can include an outer drape adapter 107 configured to axially retain the inner drape adapter 105 to the instrument controller 101. The outer drape adapter 107 can be configured to sandwich the drape opening structure 503 to the housing 101a of the instrument controller 101. The assembly 99 can include any suitable portions of a controller adapter system (e.g., for retaining a drape) as disclosed herein.

In accordance with at least one aspect of this disclosure, referring additionally to FIGS. 8A-8F, a method of installing a drape (e.g., drape 500) to an instrument controller (e.g., controller 101) of a robotic surgical system can include inserting a portion of an instrument controller (e.g., housing 101a) through a drape opening structure (e.g., structure 503), attaching an inner drape adapter (e.g., adapter 105) to the instrument controller (e.g., controller 101), and placing an outer drape adapter (e.g., adapter 107) axially over the inner drape adapter (e.g., adapter 105) to engage the outer drape adapter (e.g., adapter 107) to a housing (e.g., housing 101a) of the instrument controller (e.g., controller 101) to sandwich the drape (e.g., drape 500) between the outer drape adapter (e.g., adapter 107) and the housing (e.g., housing 101a) of the instrument controller (e.g., controller 101). In certain embodiments, the method can include locking the outer drape adapter (e.g., adapter 107) to the housing (e.g., housing 101a) by rotating a latch in a first direction (e.g., clockwise).

Embodiments can include draping the instrument controller by positioning the drape extension over the instrument controller. Embodiments can include attaching a drape plate (e.g., drape opening structure 503) on the instrument controller. Embodiments include installing a drape adapter set after the drape plate is attached to the instrument controller 101. Installing the drape adapter set can include attaching an inner drape adapter 105 to the instrument controller 101, then placing the outer drape adapter 107 onto the inner drape adapter 105, then locking the outer drape adapter 107 by rotating a latch, e.g., clockwise. Removing the drape adapter set can be done by unlocking the outer drape adapter by rotating the latch counterclockwise, then removing the outer drape adapter, then removing the inner drape adapter.

Embodiments can include a detachable coupling for attaching to a proximal end of an robotically controlled medical instrument to accommodate drape gaskets. Embodiments can include barrier drape and adapters for robotic endoluminal surgical systems (e.g., for a patient cart).

Any module(s) disclosed herein can include any suitable hardware and/or software module(s) configured to perform any suitable function(s) (e.g., as disclosed herein, e.g., as described above). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A controller adapter system for a robotic surgical instrument controller assembly, comprising:
   an instrument controller having a housing and one or more controller actuators, wherein the housing is configured to receive a drape having an unobstructed aperture defined therein, the aperture configured to be received about a periphery of the housing, the housing passing through the unobstructed aperture; and
   a drape adapter having an inner drape adapter portion and an outer drape adapter portion,
      the inner drape adapter portion configured to mount to the instrument controller and extend distally from the instrument controller, wherein the inner drape adapter portion includes one or more adapter actuators configured to receive actuation from the one or more controller actuators at a proximal side thereof, and to transmit the actuation to a distal side thereof; and
      the outer drape adapter portion configured to circumferentially engage and axially retain the inner drape adapter portion to the instrument controller, and to axially retain the drape to the housing of the instrument controller,
      wherein the instrument controller includes a unitary center post extending therefrom, and wherein the unitary center post, inner drape adapter portion and outer drape adapter portion are configured to engage in a nested configuration along a common axial extent.

2. The system of claim 1, wherein the housing of the instrument controller includes a tiered shape having a proximal tier and a distal tier, wherein the proximal tier is configured to proximally axially retain the drape.

3. The system of claim 2, wherein the proximal tier has a larger outer diameter than the distal tier.

4. The system of claim 3, wherein the proximal tier includes one or more housing alignment features to receive one or more corresponding outer drape adapter alignment features of the outer drape adapter portion.

5. The system of claim 1, wherein the inner drape adapter portion is configured to slide on to the unitary center post axially to engage the instrument controller.

6. The system of claim 5, wherein the center post and/or the distal tier include one or more controller orientation features, wherein the inner drape adapter portion includes one or more corresponding adapter orientation features configured to mate with the one or more controller orientation features to require the inner drape adapter portion to slide onto the center post in one or more circumferential orientations to ensure proper mounting of the inner drape adapter portion to the instrument controller.

7. The system of claim 5, wherein the inner drape adapter portion includes one or more electrical connectors configured to contact one or more electrical connectors on the center post to create a pass through electrical and/or data connection.

8. The system of claim 1, wherein the housing of the instrument controller includes a locking mechanism configured to axially lock the outer drape adapter portion to the housing.

9. The system of claim 1, further comprising the drape having the aperture configured to mount on the housing of the instrument controller.

10. The system of claim 9, further comprising a rigid ring defining an inner periphery of the drape aperture.

11. The system of claim 10, wherein the rigid ring includes one or more openings to allow one or more outer drape adapter alignment features and/or one or more housing alignment features to pass through the rigid ring to allow alignment and/or orientation of the outer drape adapter portion relative to the instrument controller.

12. The system of claim 9, wherein when the drape is positioned over the instrument controller and the inner and outer drape adapter portions are engaged with the instrument controller, a sterile barrier is defined thereby.

13. The system of claim 1, wherein the one or more adapter actuators are configured to transmit only pushing force from the instrument controller.

14. The system of claim 1, wherein the outer drape adapter portion is configured to engage the inner drape adapter portion, radially outwardly from the inner drape adapter portion.

15. A robotic surgical instrument controller assembly, comprising:
   a housing for an instrument controller, the housing configured to receive a drape having an unobstructed aperture defined therein, the aperture configured to be received about a periphery of the housing, the housing passing through the unobstructed aperture; and
   a drape adapter having an inner drape adapter portion and an outer drape adapter portion,
   the inner drape adapter portion configured to mount to the instrument controller and extend distally from the instrument controller, wherein the inner drape adapter portion includes one or more adapter actuators configured to receive actuation from the one or more controller actuators at a proximal side thereof, and to transmit the actuation to a distal side thereof; and
   the outer drape adapter portion configured to circumferentially engage and axially retain the inner drape adapter portion to the instrument controller, and to axially retain the drape to the housing of the instrument controller,
   wherein the instrument controller includes a unitary center post extending therefrom, and wherein the unitary center post, inner drape adapter portion and outer drape adapter portion are configured to engage in a nested configuration along a common axial extent.

16. The assembly of claim 15, wherein the housing includes a tiered shape having a proximal tier and a distal tier, wherein the proximal tier is configured to proximally axially retain the drape.

17. The assembly of claim 16, wherein the proximal tier has a larger outer diameter than the distal tier.

18. The assembly of claim 17, wherein the proximal tier includes one or more housing alignment features to receive one or more corresponding outer drape adapter alignment features of the outer drape adapter portion.

19. The assembly of claim 15, wherein the inner drape adapter portion is configured to axially slide on to the unitary center post extending from the instrument controller to engage the instrument controller.

20. The assembly of claim 19, wherein the center post and/or the distal tier include one or more controller orientation features, wherein the inner drape adapter portion includes one or more corresponding adapter orientation features configured to mate with the one or more controller orientation features to require the inner drape adapter portion to slide onto the center post in one or more circumferential orientations to ensure proper mounting of the inner drape adapter portion to the instrument controller.

21. The assembly of claim 20, wherein the inner drape adapter portion includes one or more electrical connectors configured to contact one or more electrical connectors on the center post to create a pass through electrical and/or data connection.

* * * * *